United States Patent
Takahashi

[11] Patent Number: 5,614,936
[45] Date of Patent: Mar. 25, 1997

[54] IMAGE FORMING APPARATUS FOR REPRODUCING AN IMAGE WITH MULTIPLE DENSITY LEVELS OF GRAY SCALE

[75] Inventor: Naoki Takahashi, Moriguchi, Japan

[73] Assignee: Matsushita Electric Industrial Co., Ltd., Kadoma, Japan

[21] Appl. No.: 322,183

[22] Filed: Oct. 12, 1994

[30] Foreign Application Priority Data

Oct. 15, 1993 [JP] Japan ................... 5-258535

[51] Int. Cl.⁶ ........................... B41J 2/47; B41J 2/435
[52] U.S. Cl. ................................ 347/240; 347/237
[58] Field of Search ................... 347/238, 237, 347/240, 206

[56] References Cited

U.S. PATENT DOCUMENTS

| | | | |
|---|---|---|---|
| 4,700,206 | 10/1987 | Yamakawa. | |
| 5,006,870 | 4/1991 | Hirahara et al. | 347/206 |
| 5,245,355 | 9/1993 | Morton | 347/240 |
| 5,255,013 | 10/1993 | Ng et al. | 347/240 |

FOREIGN PATENT DOCUMENTS 6427945  1/1989  Japan.

*Primary Examiner*—Benjamin R. Fuller
*Assistant Examiner*—Thinh Nguyen
*Attorney, Agent, or Firm*—Renner, Otto, Boisselle & Sklar

[57] ABSTRACT

The present invention provides an image forming apparatus comprising a conversion circuit for receiving an image signal indicating the density of a pixel in an image formed from a plurality of the pixels arranged in a matrix of a main scanning direction and a sub scanning direction crossing at right angles and for converting the image signal into a signal indicating a coloring pattern corresponding to the density; and a printing device for receiving the signal indicating the coloring pattern and for printing the image on a medium by coloring each of the plurality of the pixels in accordance with the coloring pattern. In this image forming apparatus, each of the plurality of the pixels is divided into N sub-pixels in the sub scanning direction, wherein N is an integer larger than 1, and the conversion circuit generates, as the signal indicating the coloring pattern of each pixel, a signal indicating one of L patterns selected in accordance with the image signal, wherein L is an integer larger than N+1. Each of the L patterns indicates which sub-pixels among the N sub-pixels are to be colored, thereby attaining L different densities of the pixel.

11 Claims, 19 Drawing Sheets

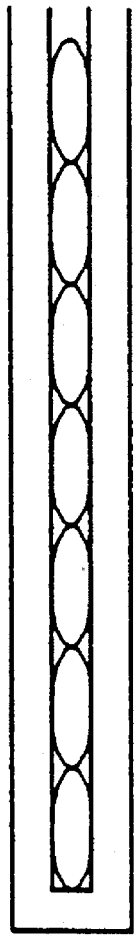
FIG. 18

IMAGE FORMING APPARATUS FOR REPRODUCING AN IMAGE WITH MULTIPLE DENSITY LEVELS OF GRAY SCALE

BACKGROUND OF THE INVENTION

1. Field of the Invention

The present invention relates to an image forming apparatus. Particularly, the present invention relates to an optical printer for forming an image by an electrophotographic system using an array head and a thermal printer for thermosensible recording using a thermal head.

2. Description of the Related Art

FIG. 1 shows a schematic configuration of a conventional optical printer. Around a photosensitive drum 101 are disposed a charger 102, an LED array head 103, a developer 106, a transfer charger 107, a scraper 109 and an eliminating lamp 110 in this order in the rotating direction of the photosensitive drum 101. The charger 102 charges the surface of the photosensitive drum 101 to a potential of several hundreds volts. A drive circuit 105 drives the LED array head 103 in accordance with an externally input image signal 104. Light emitted by the LED array head 103 forms an electrostatic latent image on the surface of the photosensitive drum 101 previously charged by the charger 102. The electrostatic latent image formed through the exposure by the LED array head 103 is invisible at this point, and is changed into a visible image through the development by the developer 106, that is, the attachment of toner supplied from the developer 106. The transfer charger 107 forms an electric field by using a difference in potential between the surfaces thereof and the photosensitive drum 101. As a result, the toner forming the visible image is transferred onto recording paper conveyed by paper feed rollers 111. The recording paper bearing the toner is allowed to pass through heated rollers in a fixer 108, resulting in fixing the visible toner image onto the recording paper. The scraper 109 scrapes the residual toner that has not attached to the recording paper off the photosensitive drum 101. The entire surface of the photosensitive drum 101 is then exposed by the eliminating lamp 110 so that the electrostatic latent image remained thereon be eliminated before the subsequent image forming operation.

FIG. 2 is a diagram showing a light emitting portion of the conventional LED array head 103. FIG. 3 shows conventional exposure of a plurality of pixels constituting an electrostatic latent image formed on the photosensitive drum 101 (hereinafter referred to as merely the "pixels"). The LED array head 103 includes a substrate 112, a plurality of electrodes 113 and a plurality of light emitting elements 114 both arranged on the substrate 112. The electrodes 113 and the light emitting elements 114 are arranged parallel to the main scanning direction. Each of the light emitting elements 114 has a width W that is sufficiently large for the exposure of the pixels each having a width of W'. A width herein indicates a length in the main scanning direction and a height herein indicates a length in the sub scanning direction.

The height H of each light emitting element 114 is ¼ of the height H' of each pixel. The light emitting element of this size can expose a quarter of the pixel having the height of H'. Specifically, in the optical printer having the LED array head 103 as shown in FIG. 2, each pixel is divided into four portions in the sub scanning direction and scanning is conducted four times to expose each of the four portions of the pixel, thereby exposing the entire pixel. When the number of the divided portions in a pixel is eight, the height H of the light emitting element is ⅛ of the height H' of the pixel and scanning is conducted eight times to expose the entire pixel. Thus, it is comparatively easy to refine the pixels not along the alignment direction of the light emitting elements 114, that is, in the main scanning direction, but in the rotating direction of the photosensitive drum, that is, in the sub scanning direction.

During the formation of an image, the LED array head 103 shown in FIG. 2 exposes respective pixels 115 as shown in FIG. 3 in accordance with an image signal, a control signal and a pixel clock signal. In this exposure, a quarter of each pixel 115 is independently exposed. In this manner, each pixel is divided into n sub-pixels in the sub scanning direction and scanning is conducted n times. The entire scanning of one pixel is thus completed. During the scanning conducted n times on one pixel, the number of the times of light emission (hereinafter referred to as the number of light emission) by the light emitting element depends upon the density of the pixel according to an externally input image signal. When the number of light emission by the light emitting element is determined to be m (wherein m is an integer; $0 \leq m \leq n$), the sub-pixels up to the mth sub-pixel are successively exposed in the sub scanning direction. For example, when the number of light emission is one, the first sub-pixel alone is exposed. When the number of light emission is two, the first and the second sub-pixels are exposed. An optical printer using the LED array head as shown in FIG. 2 achieves n+1 density levels of gray scale (hereinafter referred to as gray scale levels) in this manner.

Next, a thermal printer using a heat collecting type thermal head will be described referring to FIG. 4, which shows a schematic configuration of a conventional thermal printer. As is shown in FIG. 4, recording paper is fed between a thermal head 120 and a roller 121 in the leftward direction as shown with an arrow in the drawing by convey rollers 116. An ink sheet 119 is wound around and supplied from an ink sheet set roller 118, passes between the recording paper and the thermal head 120 and is rewound around an ink sheet wound roller 117. The thermal head 120 includes a heating element and a drive circuit for the same (neither shown). The thermal head 120 supplies a current to the heating element in accordance with an externally input image signal. The ink on the ink sheet 119 is melted by the heat thus generated by the heating element and attached onto the recording paper. A used portion of the ink sheet 119 having passed between the thermal head 120 and the roller 121 is rewound around the ink sheet rewinding roller 117. Thus, a fresh portion of the ink sheet 119 is always supplied between the thermal head 120 and the roller 121.

In reproducing gray scale levels in such a thermal printer, each pixel is divided into n sub-pixels in the feeding direction of recording paper (i.e., in the leftward direction in FIG. 4) in the same manner as in the optical printer, and the heating element is switched on/off with respect to each sub-pixel. Also in this case, the thermal printer achieves n+1 gray scale levels.

SUMMARY OF THE INVENTION

The image forming apparatus of this invention comprises converting means for receiving an image signal indicating a density of a pixel in an image formed from a plurality of the pixels arranged in a matrix of a main scanning direction and a sub scanning direction crossing at right angles and for converting the image signal into a signal indicating a coloring pattern corresponding to the density; and printing means for receiving the signal indicating the coloring pattern and for printing the image on a medium by coloring each of the plurality of the pixels in accordance with the coloring pattern. In the present image forming apparatus, each of the plurality of the pixels is divided into N sub-pixels in the sub scanning direction, wherein N is an integer larger than 1, and the converting means generates, as the signal indicating the coloring pattern of each pixel, a signal indicating one of L patterns selected in accordance with the image signal, wherein L is an integer larger than N+1. Each of the L patterns indicates which sub-pixels among the N sub-pixels are to be colored, thereby attaining L different densities of the pixel.

In one embodiment, the image forming apparatus further comprises a photosensitive body, and the printing means comprises exposing means for forming a latent image on the photosensitive body by exposing the photosensitive body in accordance with the selected coloring pattern, developing means for forming the image on the photosensitive body by developing the latent image, and transferring means for transferring the image from the photosensitive body onto the medium.

In one embodiment, the exposing means comprises a light emitting element array including a plurality of light emitting elements aligned parallel to the main scanning direction and driving means for driving the respective light emitting elements in accordance with the selected coloring pattern.

In one embodiment, each of the light emitting elements is in the shape of a rectangular having longer sides extending parallel to the main scanning direction.

In one embodiment, each of the light emitting elements is in the shape of an ellipse with a major axis extending parallel to the main scanning direction.

In one embodiment, the exposing means includes a light source; light amount control means provided between the photosensitive body and the light source; and driving means for driving the light amount control means in accordance with the selected coloring pattern.

In one embodiment, the converting means includes memory means for storing the L patterns.

In one embodiment, the converting means includes a combination logic circuit for receiving the image signal and for outputting one of the L patterns selected in accordance with the image signal as the signal indicating the coloring pattern.

In one embodiment, the printing means comprises a thermal head including a plurality of heating elements aligned parallel to the main scanning direction and driving means for supplying a current to each of the heating elements to be heated in accordance with the selected coloring pattern.

In one embodiment, each of the heating elements has heat distribution characteristics that the heat amount in each of the heating elements is largest in the center thereof in the main scanning direction and gradually decreases toward the periphery thereof.

Alternatively, the present invention provides a printing method comprising the steps of converting an image signal indicating the density of a pixel in an image formed from a plurality of the pixels arranged in a matrix of a main scanning direction and a sub scanning direction crossing at right angles into a signal indicating a coloring pattern corresponding to the density, each pixel being divided into N sub-pixels aligned in the sub scanning direction, wherein N is an integer larger than 1; and printing the image on a medium by coloring each pixel in accordance with the coloring pattern. In this method, the step of converting includes the step of generating, as the signal indicating the coloring pattern, a signal indicating one of L patterns selected in accordance with the image signal, wherein L is an integer larger than N+1. Each of the L patterns indicates which sub-pixels among the N sub-pixels are to be colored, thereby attaining L different densities of the pixel.

Thus, the invention described herein makes possible the advantages of providing an image forming apparatus and a method for forming an image in which a pixel is divided into a plurality of sub-pixels in the sub scanning direction for achieving a much larger number of gray scale levels than the number of the sub-pixels +1.

These and other advantages of the present invention will become apparent to those skilled in the art upon reading and understanding the following detailed description with reference to the accompanying figures.

BRIEF DESCRIPTION OF THE DRAWINGS

FIG. 18 is a diagram of an LED array head having a light emitting portion in the shape of an ellipse.

DESCRIPTION OF THE PREFERRED EMBODIMENTS

The principle of an image forming apparatus of this invention will be first described before describing the specific configuration thereof. In the image forming apparatus of this invention, one pixel is divided into n sub-pixels in the sub scanning direction and scanning is conducted n times on the pixel to form an image corresponding to that particular pixel in the same manner as in the conventional image forming apparatus. In the image forming apparatus of this invention, however, when m sub-pixels (wherein m is an integer; $0 \leq m \leq n$) are colored through the n scanning, it is not that the first through the mth sub-pixels are colored in this order but that certain sub-pixels selected in accordance with the density of the pixel to be reproduced are colored. The word "to color a sub-pixel" herein means to attach a pigment such as toner and ink onto the sub-pixel.

Which sub-pixels are selected to be colored in accordance with the density to be reproduced, namely, a coloring pattern in accordance with the density, is determined so that the average density in one pixel to be colored according to the coloring pattern be approximately equal to the density to be reproduced. Various coloring patterns are previously determined by measuring the average densities of images actually formed in accordance with the respective coloring patterns, and are stored in the image forming apparatus. When an image signal indicating the density of each pixel is externally input in the formation of an image, the input image signal is converted into one of the stored coloring patterns in accordance with the density indicated by the image signal. Each pixel is colored in accordance with the coloring pattern.

Figure 15:
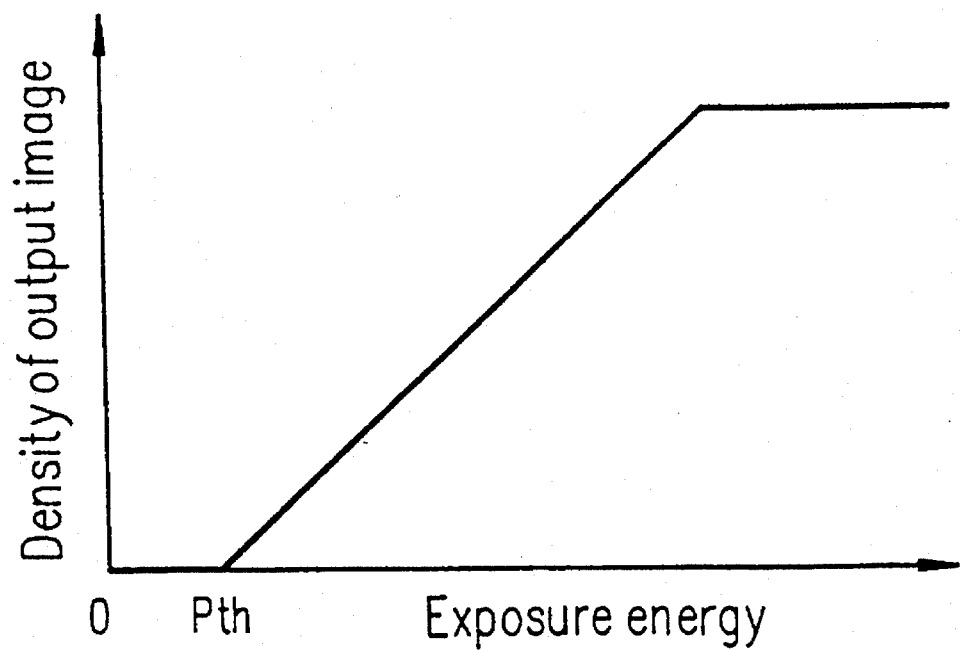
FIG. 15 is a graph showing the relationship between exposure energy for a pixel and the average density of the pixel in an output image.

A specific method for determining the color-pattern (i.e., an exposing pattern) in an optical printer using an LED array head will be described referring to FIGS. 15, 16A, 16B, 17A and 17B. The average density of a pixel depends upon the amount of toner attached to the pixel. The amount of the attached toner depends upon the surface potential decreased by the exposure energy applied during the exposure of the surface of a photosensitive drum. FIG. 15 shows the relationship between the exposure energy applied to one pixel and the average density of the pixel in an output image. As is shown in FIG. 15, when the exposure energy is smaller than a threshold value Pth, the surface potential is not decreased to generate sufficient electrostatic energy required for the transfer of the toner onto the surface of the photosensitive drum. Therefore, in this case, the toner is not attached and the resultant output image remains white. When the exposure energy exceeds the threshold value Pth, the density of the pixel in the output image is simply increased as the exposure energy increases. When the exposure energy is further increased, the density is gradually saturated and finally is little varied by the increase of the exposure energy. This is because the entire pixel is already exposed by the exposure energy exceeding the threshold value Pth, thereby being completely covered with the attached toner. Further exposure energy would not change the density in the output image. Accordingly, it can be regarded that the average density of one pixel is indicated as a proportion of an area in one pixel subjected to the exposure energy exceeding the threshold value Pth. Therefore, even when the same number of light emission is conducted on each pixel, that is, the same total exposure energy is applied to each pixel, an area subjected to an exposure energy exceeding the threshold value Pth can be varied in each pixel by using different exposing patterns, resulting in reproducing various densities.

Figure 16A:
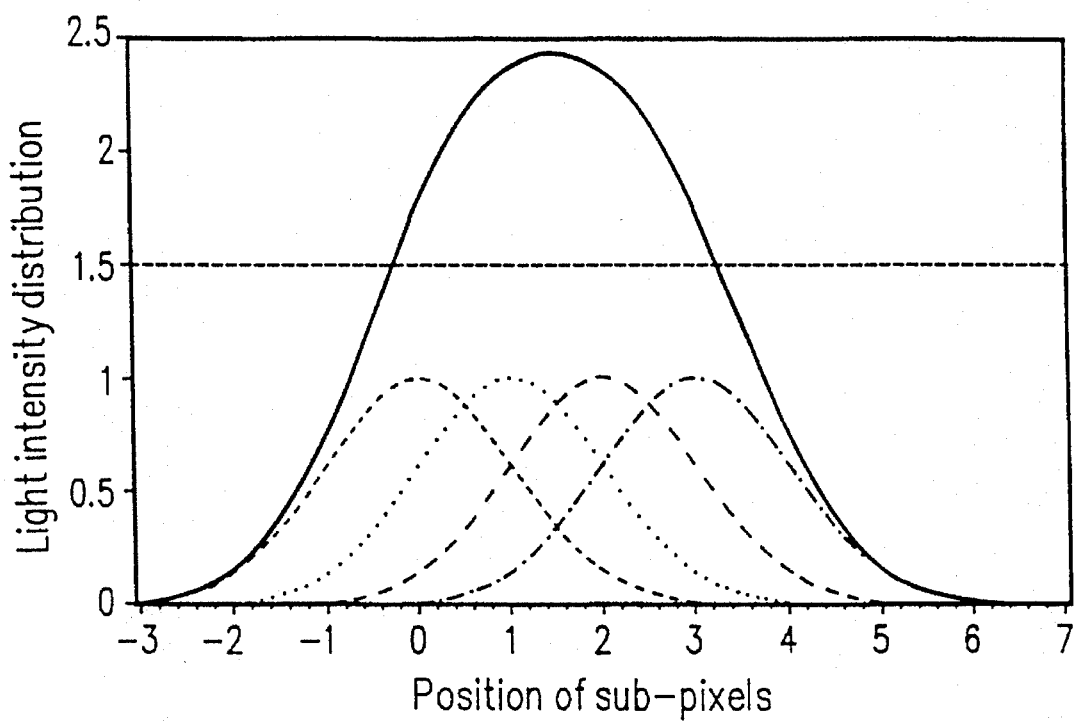
FIGS. 16A and 16B are graphs showing the light intensity distribution in a pixel exposed in various exposing patterns.
Figure 16B:
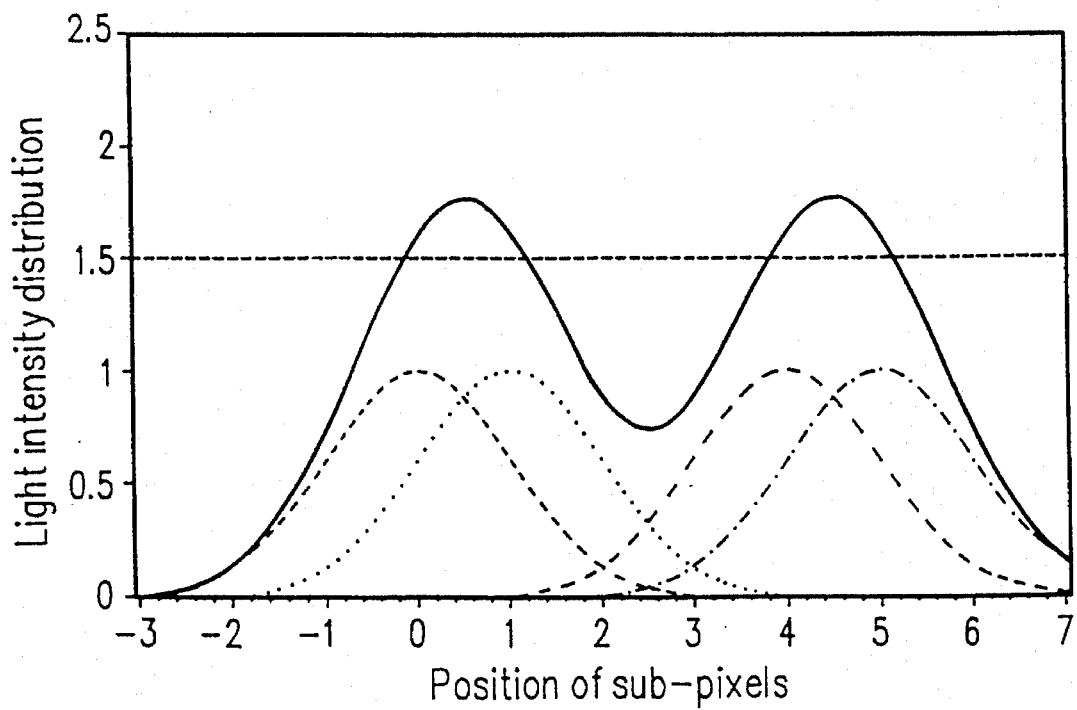

FIGS. 16A and 16B show the distribution of light intensity, i.e., the exposure energy, applied to one pixel, wherein the pixel is divided into eight portions in the sub scanning direction and the number of light emission is four. FIG. 16A is obtained in the case where the first through the fourth sub-pixels are exposed and the rest are not, and FIG. 16B is obtained in the case where the first, the second, the fifth and the sixth sub-pixels are exposed and the rest four are not. The intensity distribution of light emitted by a single light emitting element of an LED array head is a Gaussian distribution with the center thereof on the position of the light emitting element as shown in broken lines in FIGS. 16A and 16B. The entire intensity distribution of light emitted by a plurality of the light emitting elements is obtained by adding up all the light intensity distributions of the respective light emitting elements as shown in solid lines in FIGS. 16A and 16B. The intensity distribution of light emitted by a single light emitting element herein is normalized, and the threshold value Pth is assumed to be 1.5. Under this condition, toner is attached merely to an area subjected to the exposure with the total light intensity exceeding 1.5, thereby visualizing an output image.

As is understood from FIGS. 16A and 16B, when the combination of sub-pixels to be exposed in one pixel is different, the area to which the toner is attached is also different. Since the sub-pixels to be exposed are concentrated in the case of FIG. 16A, the proportion of the area subjected to the light intensity exceeding the threshold value Pth is approximately 45%. The sub-pixels to be exposed are largely separated into two parts in the case of FIG. 16B, and hence the light intensity applied to the area between the two parts is below the threshold value Pth, resulting in wasting the exposure energy applied to this area. Further, the proportion of the area subjected to the exposure energy exceeding the threshold value Pth is approximately 33%. Thus, the area to be colored in one pixel is smaller than in the case where the sub-pixels to be exposed are concentrated as in the case of FIG. 16A. The average density of one pixel can be obtained as the average density of a certain area including that pixel when the pixels in the vicinity of that pixel can be assumed to be exposed in the same exposing pattern.

Since the exposure energy generated by one exposure is sufficient to form an output image when one pixel is divided into a small number of portions, the average density of the pixel almost always depends upon the number of light emission. When a pixel is divided into a large number of portions, however, the exposure energy generated by one exposure, that is, light emitted once by the light emitting elements, is too small or too weak to obtain sufficient energy to attach the toner. In such a case, the exposure energy does not exceed the threshold value Pth to form an output image before a plurality of the exposure energy are overlapped. Even when the number of the exposures is the same, the variation of the pattern of overlapping the exposure energy leads to the variation of the density of an output image because an area subjected to the exposure energy exceeding the threshold value Pth is varied.

Figure 17A:
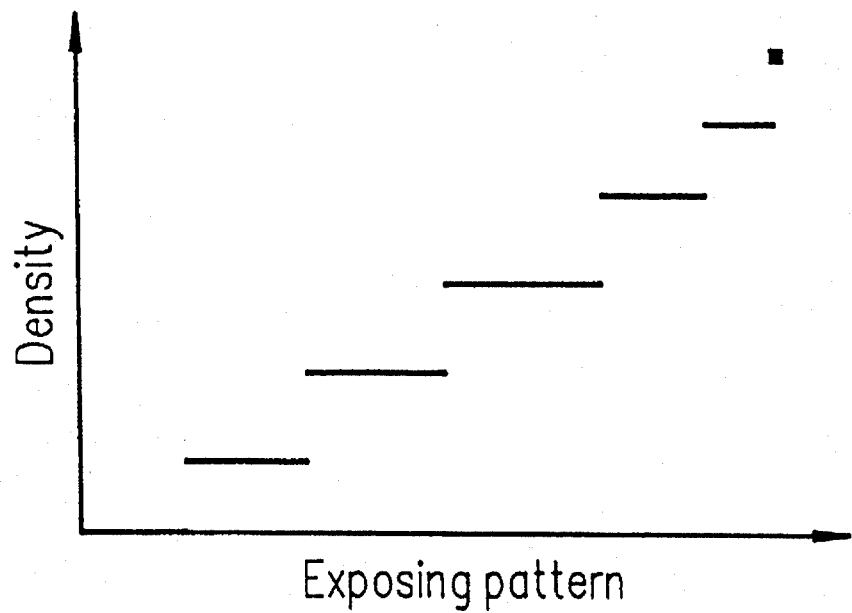
FIGS. 17A and 17B are graphs showing the relationship between the exposing pattern and reproduced density.
Figure 17B:
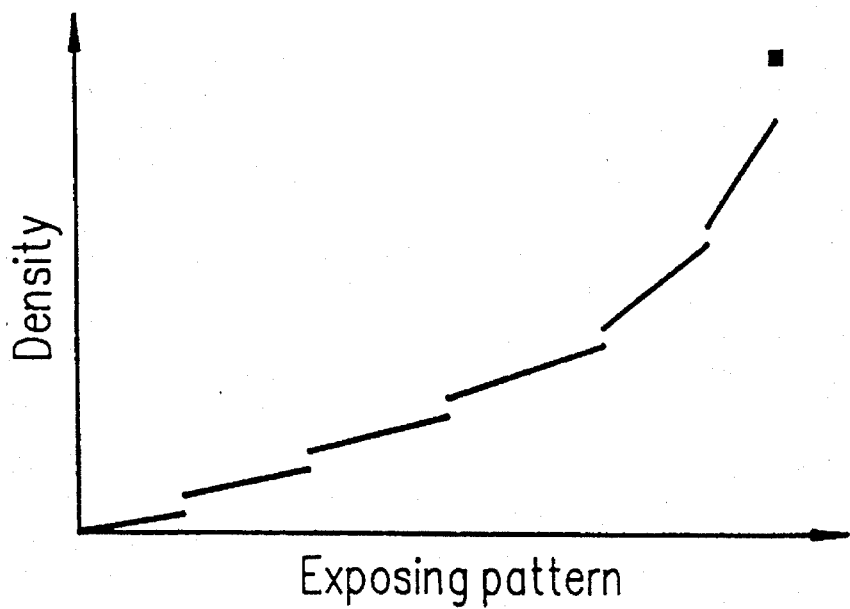

FIGS. 17A and 17B show the relationship between the exposing pattern and reproducible density. In FIG. 17A, one pixel is divided into a comparatively small number of portions, and in FIG. 17B, one pixel is divided into a sufficiently large number of portions. FIGS. 17A and 17B are plotted by obtaining the average densities of output images formed through the exposure in all the possible exposing patterns with regard to the respective numbers of division of a pixel, and ordering the obtained average densities. Accordingly, the exposing pattern indicated by the abscissa is merely a criterion indicating the number of the exposing patterns. The more horizontal a plotted line is, the larger number of the exposing patterns can be used to reproduce the density.

In FIG. 17A, the exposure energy through one exposure is large since one pixel is divided into a small number of portions. Therefore, the average density of the pixel is varied stepwise depending upon the number of light emission. As a result, the number of reproducible gray scale levels is approximately the same as the total number of light emission. On the contrary, when one pixel is divided into a large number of portions, the exposure energy through one exposure is small. As a result, an area to be colored in the pixel is varied depending upon whether or not sub-pixels to be exposed in one of the exposing patterns are concentrated, even when the same number of exposure is conducted, resulting in varying the average density in the entire pixel. In FIG. 17B, the plotted lines gradually become inclined with the right ends thereof upward. The angle of the inclination becomes larger as a pixel is divided into a larger number of portions. The highest average density obtained by the exposing pattern using the light emission of m times can be higher than the lowest average density obtained by the exposing pattern using the light emission of m+1 times.

In order to accurately reproduce a multivalued image, it is preferred that a difference in the density between the respective gray scale levels is constant. Therefore, among the various densities reproducible by the image forming apparatus, the gray scale levels in which the density difference is approximately constant are previously selected to be stored in the image forming apparatus together with the corresponding exposing patterns. As is apparent from FIG. 17B, when a pixel is divided into a comparatively large number of portions, the number of the densities reproducible by the image forming apparatus is increased. Therefore, it is possible to select a larger number of densities having a constant density difference. This results in a larger number of the gray scale levels. In this manner, when one pixel is divided into a comparatively large number of sub-pixels, it is possible to reproduce a larger number of gray scale levels than the number of the sub-pixels.

As described above by exemplifying an optical printer, in the image forming apparatus of this invention, an externally input image signal is converted into one of the previously determined coloring patterns in accordance with the density in each pixel, and sub-pixels in each pixel are colored in accordance with the coloring pattern. The coloring patterns are previously determined so that the variation of the combination of sub-pixels to be colored leads to the variation of the density of the entire pixel even when the same number of the sub-pixels are to be colored. Therefore, although the image forming apparatus of this invention has a comparatively simple configuration, it is possible to reproduce an image having a larger number of gray scale levels than the number of times of scanning of each pixel, i.e., the number of sub-pixels in one pixel.

Next, an optical printer will be described as the first example of this invention referring to the accompanying drawings.

Figure 1:
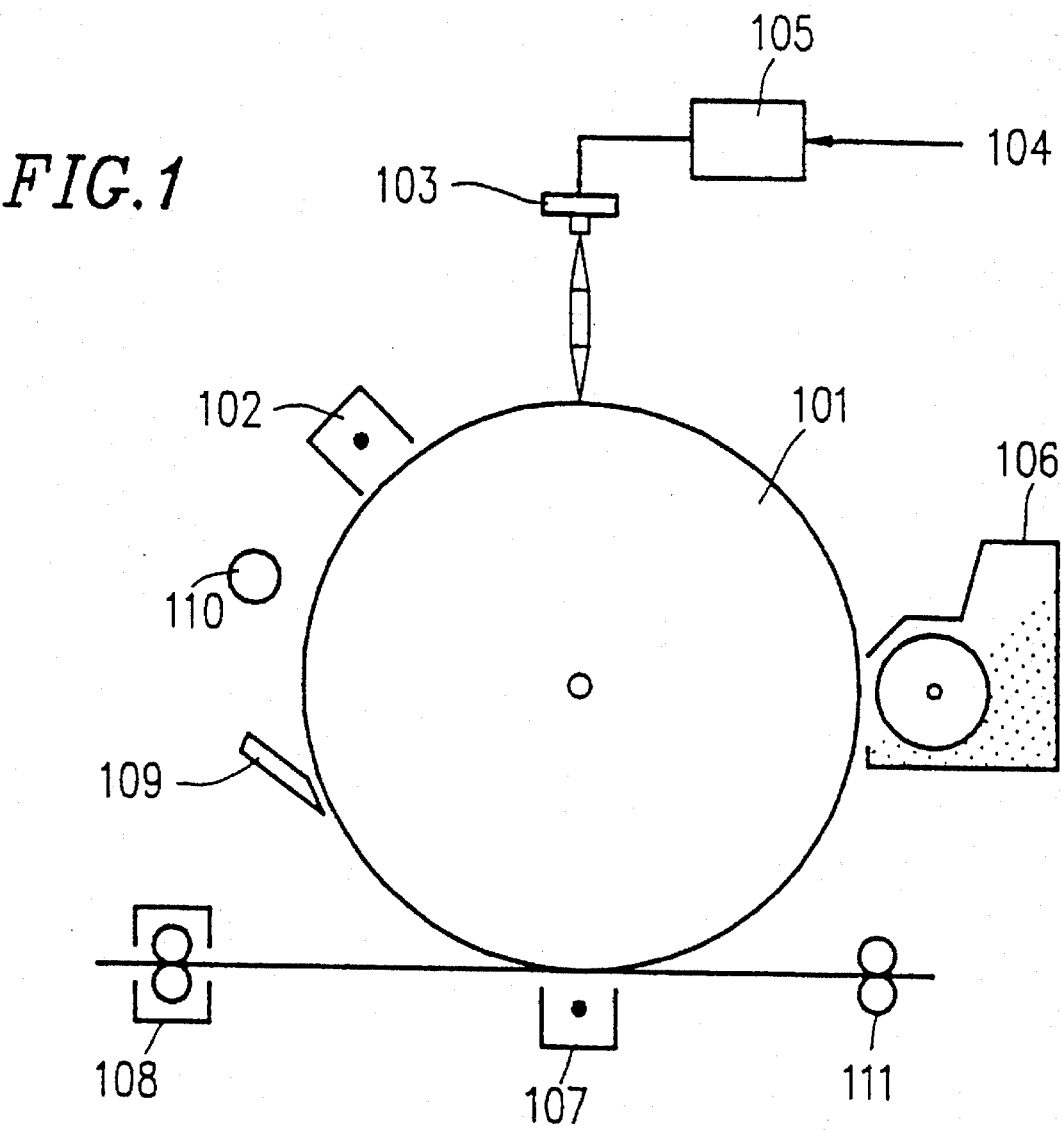
FIG. 1 is a schematic diagram of a conventional optical printer.
Figure 2:
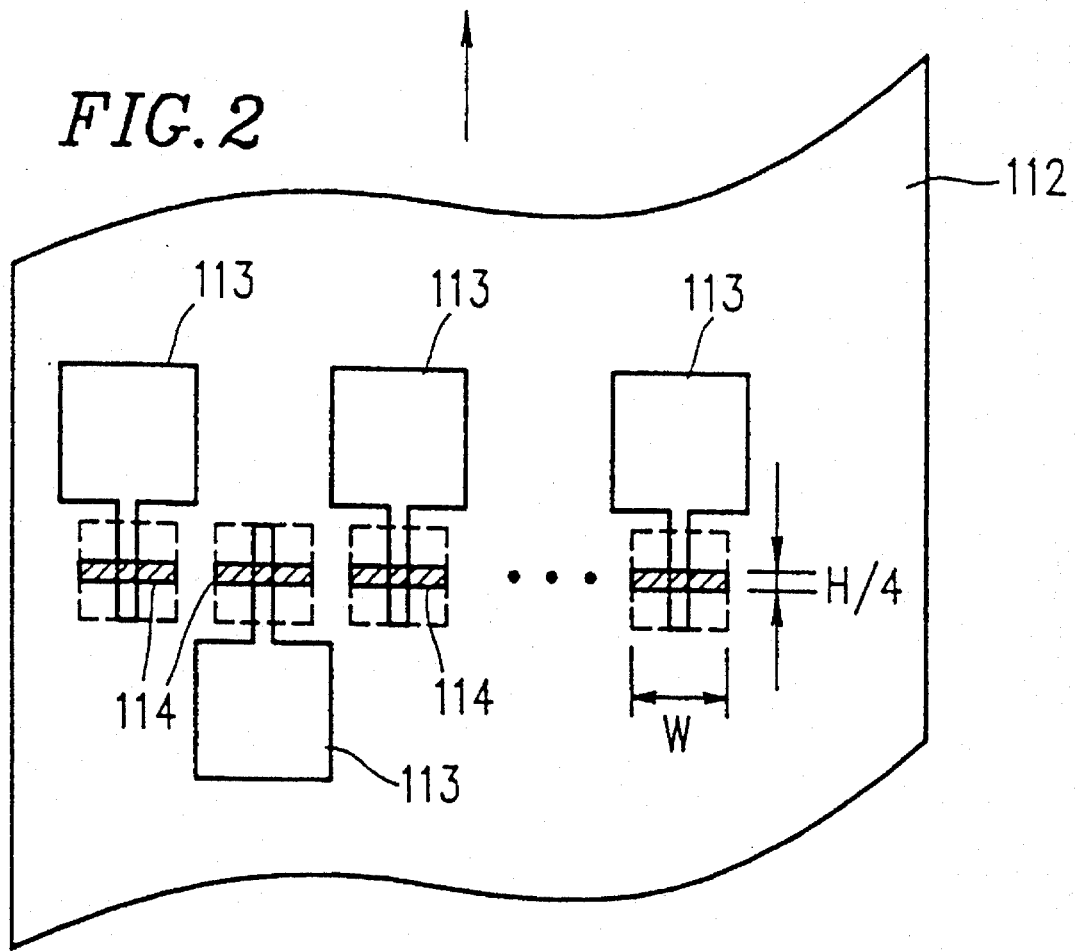
FIG. 2 is a diagram showing a light emitting portion of a conventional LED array head.
Figure 3:
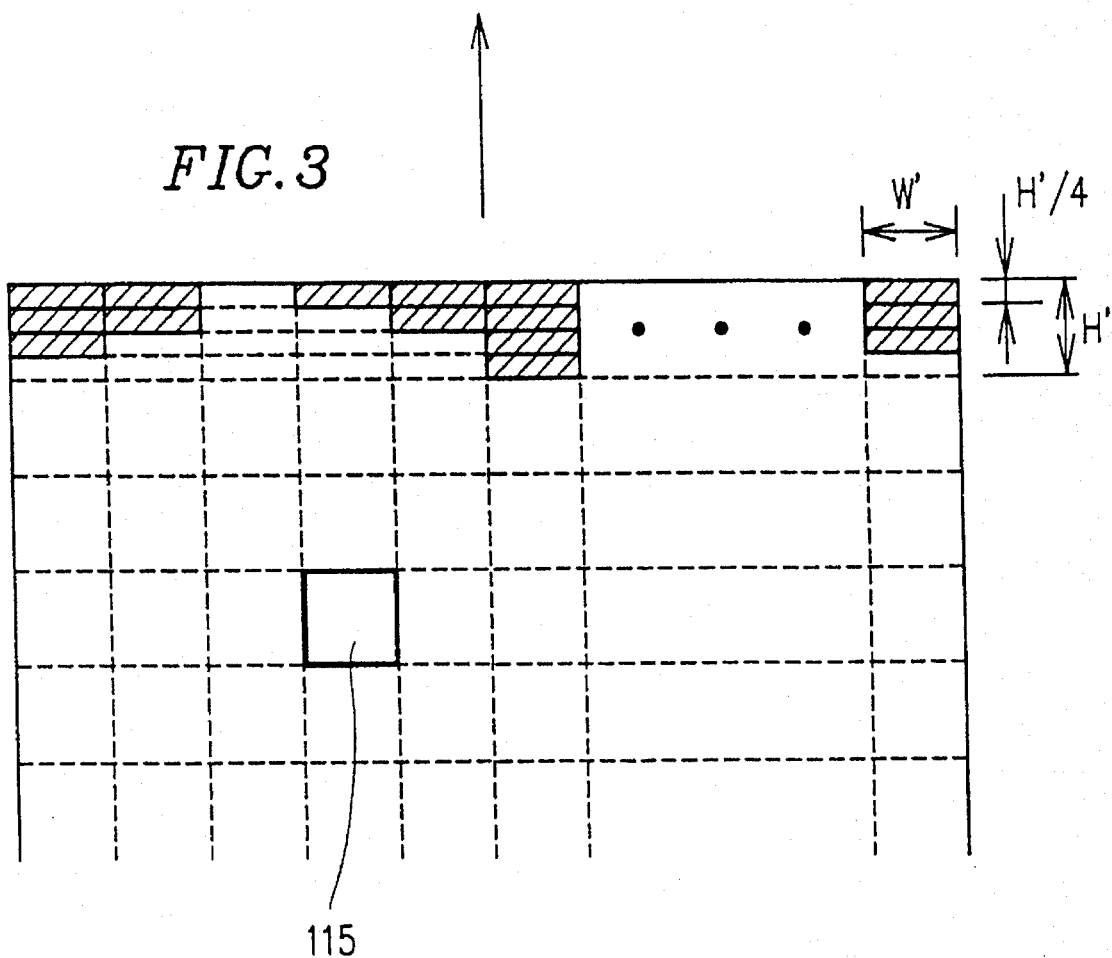
FIG. 3 shows exposure of pixels in the conventional optical printer.
Figure 4:
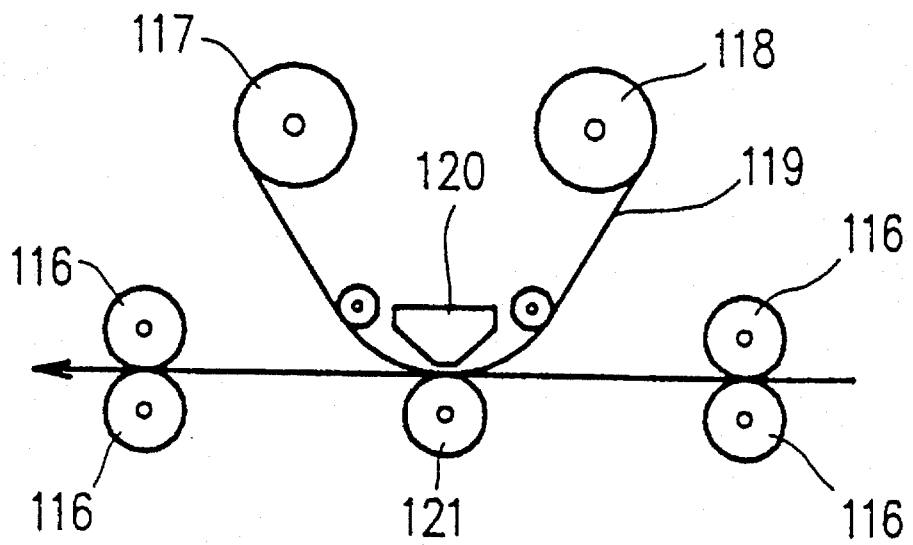
FIG. 4 is a schematic diagram of a conventional thermal printer.
Figure 5:
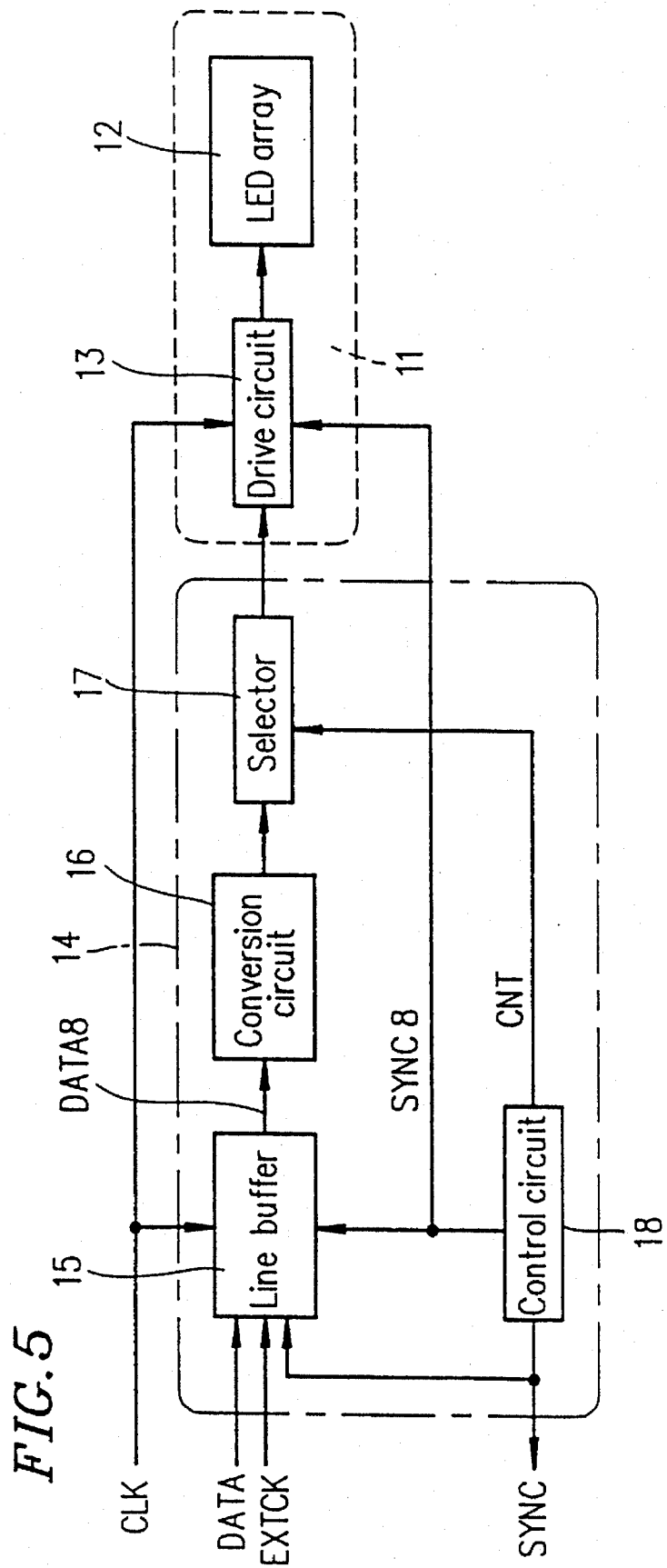
FIG. 5 is a block diagram of an exposure circuit in an optical printer in accordance with an example of this invention.

FIG. 5 is a block diagram of a major part of the optical printer for forming an image by using an LED array head 11. The LED array head 11 comprises an LED array 12 including a plurality of light emitting elements aligned parallel to the main scanning direction and a drive circuit 13 for driving the respective light emitting elements by allowing a current to flow therethrough. The LED array head 11 is connected with an exposure control circuit 14 for driving the LED array head 11 in accordance with an externally input image signal DATA. The exposure control circuit 14 comprises a line buffer 15, a conversion circuit 16, a selector 17 and a control circuit 18.

The line buffer 15 has two line memories each of which can store an image signal DATA regarding one row of pixels aligned parallel to the main scanning direction (hereinafter referred to as "one line of pixels"). The image signal DATA indicates the density of a pixel with multi-valued data, for example, eight bits. While an image signal DATA is being input to one of the line memories, the input of a previous image signal DATA has already finished in another line memory, through which the stored previous image signal DATA is being output. Thus, the image signals DATA are alternately input to and output from the two line memories. The image signals DATA stored in the line buffer 15 are successively output to the conversion circuit 16 as described below, where each of the image signals DATA is converted into one of the exposing patterns for each pixel in accordance with the density thereof. The conversion circuit 16 sends, to the selector 17, a signal of n bits indicating the exposing pattern selected through the conversion, wherein n is identical to the number of sub-pixels formed by dividing each pixel in the sub scanning direction, and the value of each bit (i.e., 0 or 1) indicates exposure or non-exposure of the corresponding sub-pixel. The conversion circuit 16 repeats outputting the signal of n bits indicating the exposing pattern n times per one line of pixels. The selector 17 receives this signal of n bits from the conversion circuit 16, and successively reads the value of a bit corresponding to the number of times of outputting the signal in such a manner that it reads the value of the first bit in the first output, the value of the second bit in the second output, and finally the value of the nth bit in the nth output. Accordingly, signals are sent from the selector 17 to the drive circuit 13 of the LED array head 11 in the following order: a signal indicating exposure/non-exposure of the first sub-pixel in this line of pixels, a signal indicating exposure/non-exposure of the second sub-pixel, a signal indicating exposure/non-exposure of the third sub-pixel, . . . , and a signal indicating exposure/non-exposure of the nth sub-pixel. The drive circuit 13 actuates the LED array 12 in accordance with the signal received from the selector 17 so that the LED array 12 conducts scanning n times with regard to one line of pixels. The control circuit 18 generates control signals such as a line synchronous signal SYNC and an 8-fold line synchronous signal SYNC8, thereby synchronizing the respective signals generated in the exposure control circuit 14.

The operation of an optical printer having the above-mentioned exposure control circuit 14 and LED array head 11 will now be described referring to a timing chart shown in FIG. 6. In the following description, one pixel is assumed to be divided into eight sub-pixels in the sub scanning direction. The control circuit 18 generates a line synchronous signal SYNC and an 8-fold line synchronous signal SYNC8. The line synchronous signal SYNC is a signal obtained by dividing the frequency of the 8-fold line synchronous signal SYNC8 by eight. In the duration of the 8-fold line synchronous signal SYNC8 generating eight low pulses, the line synchronous signal SYNC generates only one low pulse synchronously with one of the eight low pulses. The line synchronous signal SYNC is not only externally output as a synchronous signal but also supplied to the line buffer 15 in the exposure control circuit 14. Synchronously with the line synchronous signal SYNC, an image signal DATA and an external clock signal EXTCK are input to the exposure control circuit 14 in the optical printer by an external image signal generator (not shown).

Figure 6:
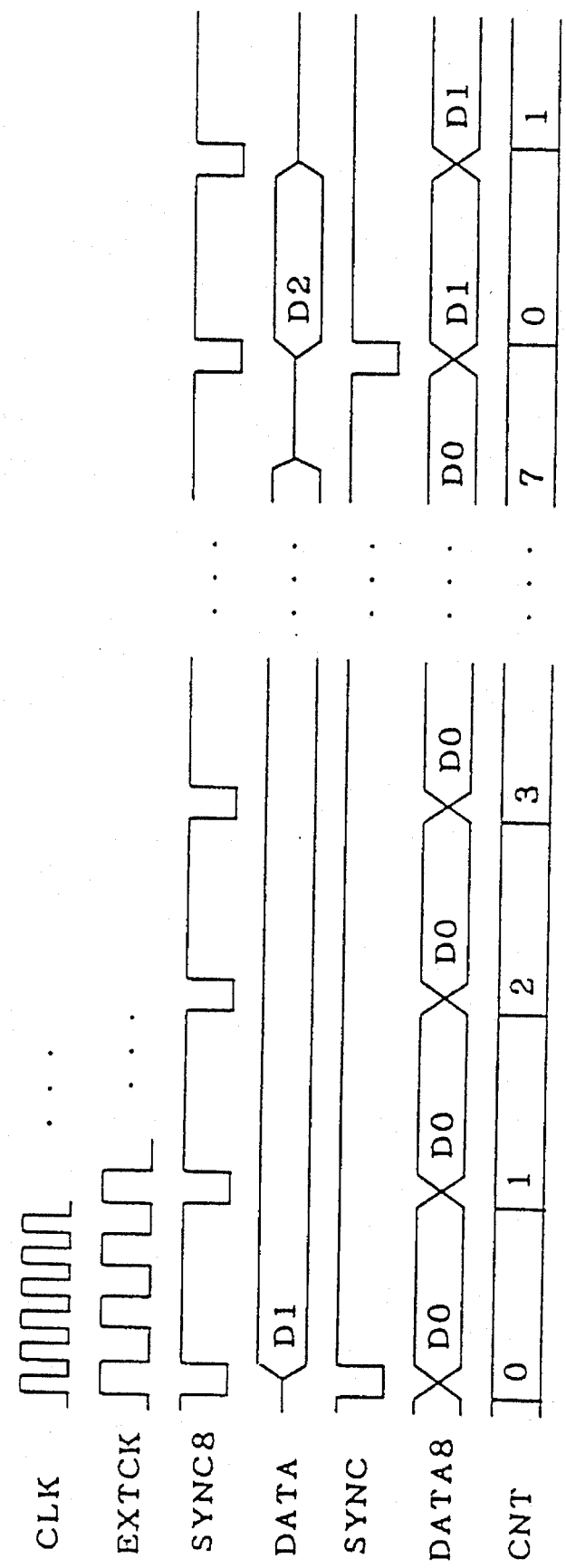
FIG. 6 is a timing chart for the operation of the exposure circuit of FIG. 5.

FIG. 6 shows the term when an image data D1 with regard to the first line of pixels and an image data D2 with regard to the second line of pixels are input to the line buffer 15 of the exposure control circuit 14. The image signal DATA with regard to one line of pixels, which is input synchronously with the external clock signal EXTCK, is stored in one of the two line memories in the line buffer 15 whichever is ready for the input. At this point, through the other line memory ready for output is output a previously stored image signal with regard to the previous line of pixels. In the timing chart of FIG. 6, while the image data D1 regarding the first line of pixels is being input to one of the line memories, an image data D0 regarding the 0th line of pixels is read from the other line memory. The image signal is read from the line buffer 15 synchronously with the 8-fold line synchronous signal SYNC8. The 8-fold line synchronous signal SYNC8 generates eight low pulses during one period of the line synchronous signal SYNC. Therefore, the image signal DATA regarding a certain line of pixels is repeatedly read eight times from the line memory ready for the output. A signal thus output from the line buffer 15 is a signal DATA8.

An image signal DATA is generated by an external image signal generator (not shown) such as a word processor and a computer, and written in the line buffer 15 synchronously with an external clock signal EXTCK as described above. At this point, time that can be spent on writing the image signal regarding one line of pixels in the line buffer 15 is at most eight times as long as time that can be spent on reading once the image signal regarding one line of pixels from the line buffer 15. This is because the image signal regarding one line of pixels is read once synchronously with one of the eight low pulses of the 8-fold line synchronous signal SYNC8 while it is written synchronously with only one low pulse of the line synchronous signal SYNC.

The image signal DATA8 output from the line buffer 15 is directly input to the conversion circuit 16. The conversion circuit 16 converts the image signal DATA8 regarding one line of pixels into an exposing patterns for respective pixels in accordance with the density to be reproduced, and then supplies a signal of eight bits indicating the exposing patterns for one line of pixels (hereinafter referred to as the "exposing pattern signal") to the selector 17. Also this exposing pattern signal supplied from the conversion circuit 16 to the selector 17 is repeated eight times per one line of pixels.

The selector 17 receives, in addition to the exposing pattern signal from the conversion circuit 16, a signal CNT from the control circuit 18. The signal CNT is an output from a three-bit counter provided in the control circuit 18. As is described in detail below, the three-bit counter starts counting at the fall of the 8-fold line synchronous signal SYNC8. The counter output signal CNT is reset at the fall of the line synchronous signal SYNC, and starts counting again at the fall of the 8-fold line synchronous signal SYNC8.

The selector 17 selects the value of a bit in the exposing pattern signal input from the conversion circuit 16 so that the order of the bit is identical to the value of the counter output signal CNT, and outputs the selected value to the LED array head 11. Herein, the case is exemplified where an image data D1 regarding the first line of pixels is read eight times from the line buffer 15 as the image signal DATA8, and is converted into an exposing pattern signal for each pixel by the conversion circuit 16. When the image data D1 read at the first time is converted into an exposing pattern signal to be input to the selector 17, the value of the counter output signal CNT is 0. Therefore, the 0th bit of the exposing pattern signal of eight bits is selected, and the 0th bit of the exposing pattern signal for this line of pixels is output to the drive circuit 13 in the LED array head 11. When the image data D1 read at the second time is converted into an exposing pattern signal to be input to the selector 17, the value of the counter output signal CNT is 1. Therefore, the first bit of the exposing pattern signal is output to the drive circuit 13. In this manner, the value of each bit of the exposing pattern signal is successively output by the selector 17. The drive circuit 13 of the LED array head 11 drives the LED array 12 synchronously with the 8-fold line synchronous signal SYNC8 in accordance with the signal input by the selector 17.

As described above, an image signal indicating the density of a pixel is converted into an exposing pattern for each pixel indicating which sub-pixels are to be exposed to reproduce the density, and the LED array head 11 is driven in accordance with the thus obtained exposing pattern signal. Thus, each pixel can be scanned in accordance with the corresponding exposing pattern.

In the above-mentioned example, an optical printer using an LED array head is exemplified to describe the configuration of the major part of the image forming apparatus of the present invention. Another type of an optical array head, however, can be used instead of the LED array head, and also in this case, the resultant optical printer can operate in the same manner as in the aforementioned example by adopting the same configuration as that described above except for the LED array head. An example of the alternate to the LED array head includes an array head comprising a light source extending in the main scanning direction and a liquid crystal shutter array also extending in the main scanning direction in which exposure/non-exposure of a sub-pixel is controlled by shuttering the liquid crystal shutter array.

Also, in a thermal printer, the configuration is approximately the same as that of the above-mentioned optical printer. In the optical printer shown in FIG. 5, the LED array head 11 sends a current to the respective light emitting elements of the LED array 12, thereby allowing the light emitting elements to emit light. Similarly, a thermal head is heated by sending a current to respective heating elements in a thermal printer. Therefore, in the configuration shown in FIG. 5, the portion from the line buffer 15 to the drive circuit 13 is also used for the thermal printer. In sum, one pixel is divided into eight sub-pixels in the recording paper feeding direction, i.e., in the sub scanning direction, and an image signal indicating the densities of one line of pixels is converted into a signal indicating heating patterns for the line of pixels. Each heating pattern indicates which sub-pixels are to be heated by the corresponding heating element in order to reproduce the density of the pixel. The thermal head is driven in accordance with this signal indicating the heating patterns for one line of pixels, thereby scanning the pixels arranged in the line so as to reproduce desired densities.

The configuration and the operation of each circuit shown in FIG. 5 will now be described referring to the accompanying drawings.

Figure 7:
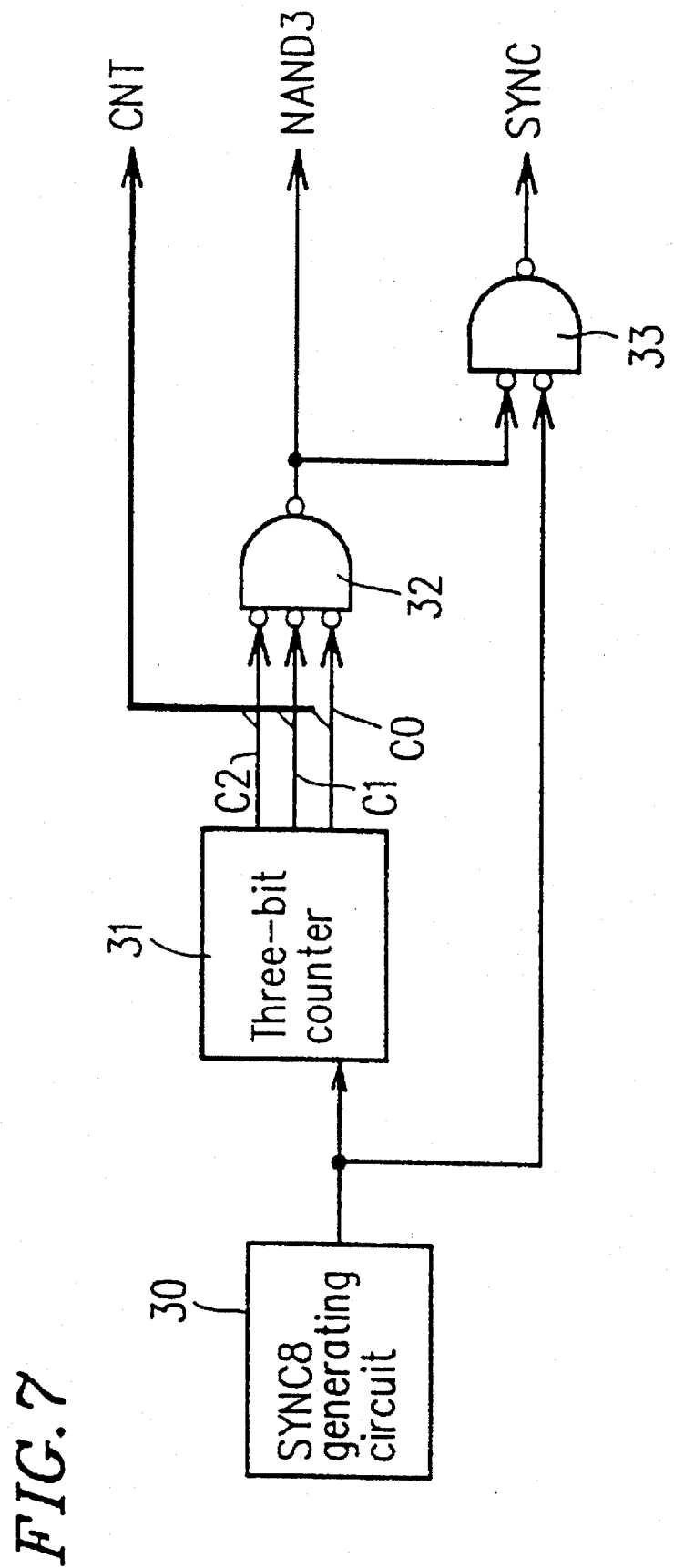
FIG. 7 is a block diagram of a control circuit in the optical printer of this invention.

FIG. 7 is a block diagram of the control circuit 18. The control circuit 18 includes a SYNC8 generating circuit 30, a three-bit counter 31, a three-input NAND gate 32 and a two-input NAND gate 33.

Figure 8:
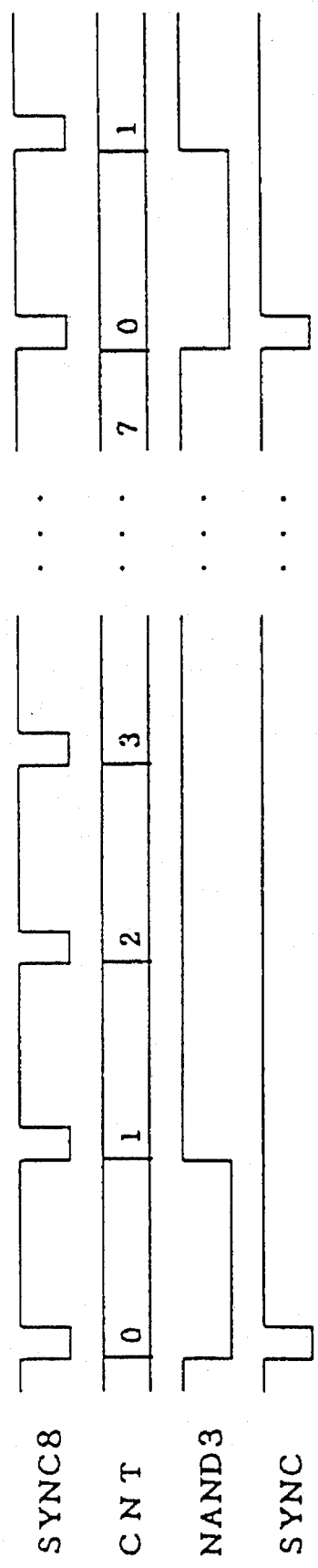
FIG. 8 is a timing chart in the operation of the control circuit of FIG. 7.

The operation of the control circuit 18 will be described referring to FIGS. 7 and 8. The SYNC8 generating circuit 30 generates a low pulse at a certain period as shown in FIG. 8. The period is determined as ⅛ of the time required for the photosensitive drum to rotate by a distance equal to the length of one pixel. That is to say, the SYNC8 generating circuit 30 generates eight low pulses while the photosensitive drum is rotating by a distance equal to the length of one pixel. The low pulse generated by the SYNC8 generating circuit 30 is supplied to the clock terminal of the three-bit counter 31 as the 8-fold line synchronous signal SYNC8. The three-bit counter 31 starts counting at the fall of each low pulse of the 8-fold line synchronous signal SYNC8. The outputs C2, C1 and C0 of the three-bit counter 31 are output as counter signals CNT and input to the three-input NAND gate 32. The three-input NAND gate 32 generates a signal NAND3, which is at a low level when all the input signals are at a low level as shown in FIG. 8, namely, only when the output signal CNT of the three-bit counter 31 has a value of 0, and otherwise is at a high level. The signal NAND3 is input to the two-input NAND gate 33 together with the 8-fold line synchronous signal SYNC8 generated by the SYNC8 generating circuit 30. The two-input NAND gate 33 generates a signal SYNC, which is at a low level when all the input signals are at a low level and otherwise is at a high level. Accordingly, the line synchronous signal SYNC generated by the two-input NAND gate 33 is at a low level only when the counter value of the three-bit counter 31 is 0 and the 8-fold line synchronous signal SYNC8 is at a low level, and otherwise is at a high level. In other words, the line synchronous signal SYNC falls simultaneously with one of the eight falls of the 8-fold line synchronous signal SYNC8. In this manner, the signal SYNC output from the two-input NAND gate 33 is a line synchronous signal obtained by dividing the frequency of the 8-fold line synchronous signal SYNC8 by eight.

Next, the configuration of the line buffer 15 will be described referring to FIG. 9.

The line buffer 15 includes a read counter 34, a write counter 35, an address selector 36, a data selector 37, a line memory A 38, a line memory B 39, a toggle F/F 40, OR gates 41 and 42, and an inverter gate 43. Both the read counter 34 and the write counter 35 are counters of twelve bits having a clock input terminal CK and a reset terminal RST-. The address selector 36 receives outputs of twelve bits from the read counter 34 and the write counter 35, and supplies its outputs to the line memories, respectively, in accordance with a signal input through the select terminal thereof. The data selector 37 receives two eight-bit signals respectively output from the line memory A 38 and the line memory B 39, and selects one of the eight-bit signals in accordance with a signal input through the select terminal thereof synchronously with the two eight-bit signals from the line memory A 38 and the line memory B 39. The selected one of the two eight-bit signals is output to the conversion circuit 16 as an image signal DATA8. The line memory A 38 and the line memory B 39 are both line memories of 4096×8 bits having an address input terminal of twelve bits and data input/output terminals of eight bits. The data input terminals and the data output terminals of these line memories are independent from each other. The toggle F/F 40 changes the level of each input signal at every rise thereof and outputs a signal in which a high level and a low level alternate.

Figure 9:
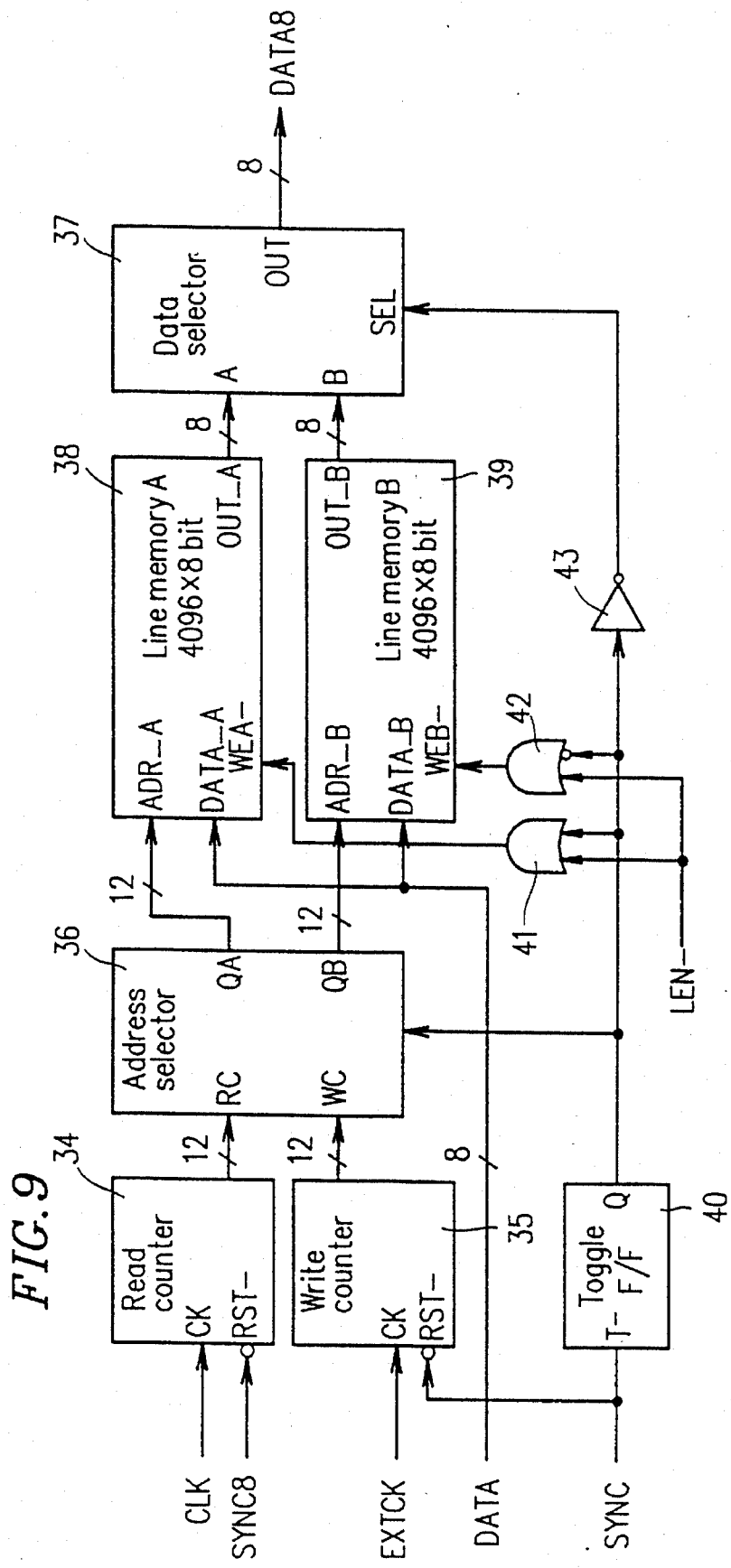
FIG. 9 is a block diagram of a line buffer in the optical printer of the invention.
Figure 10:
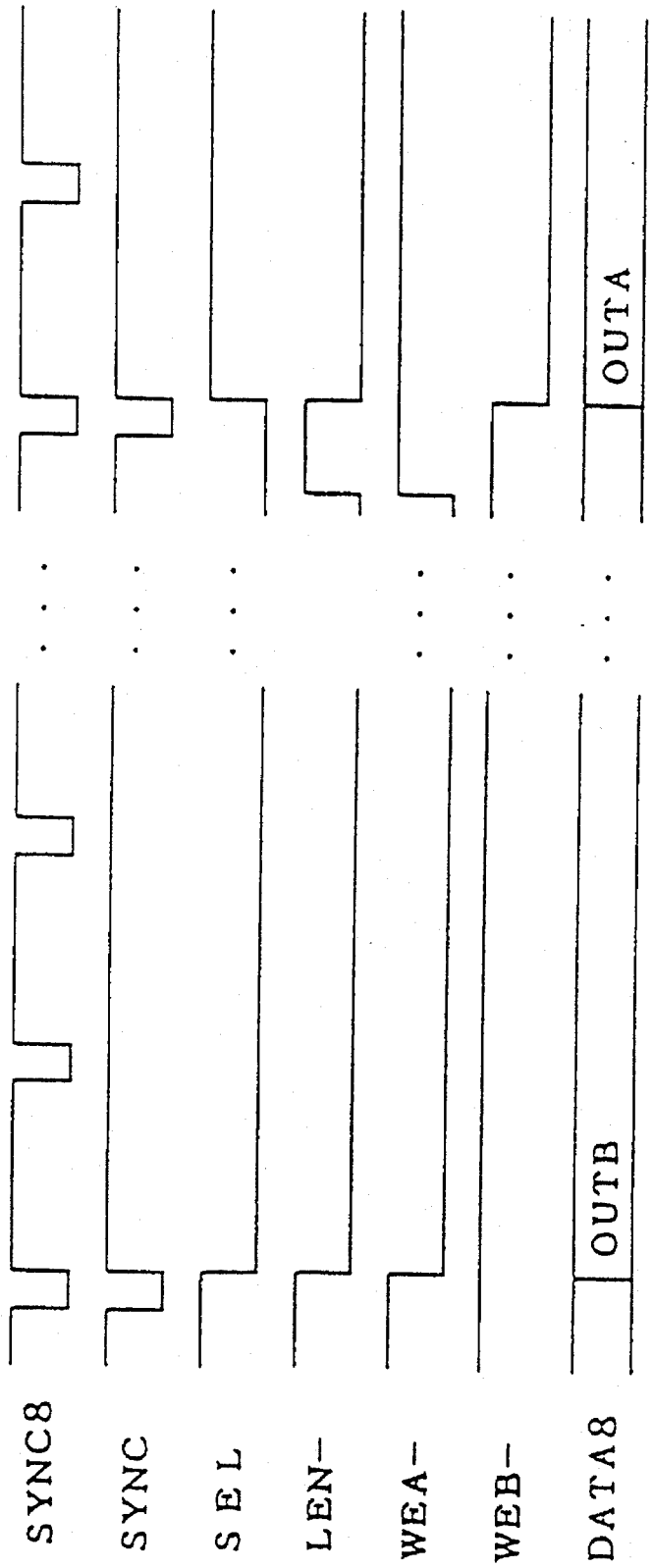
FIG. 10 is a timing chart of the operation of the line buffer of FIG. 9.

The operation of the line buffer 15 having the configuration as shown in FIG. 9 will be described referring to FIG. 10.

The line synchronous signal SYNC generated in the control circuit 18 as described above is inverted to be input to the reset terminal RST- of the write counter 35. In other words, the write counter 35 is reset by the pulse of the line synchronous signal SYNC. The 8-fold line synchronous signal SYNC8 generated in the control circuit 18 is inverted to be input to the reset terminal RST- of the read counter 34, which is, namely, reset by the pulse of the 8-fold line synchronous signal SYNC8. After being reset, the read counter 34 and the write counter 35 start counting clock signals CLK and external clock signals EXTCK, respectively. The outputs of the read counter 34 and the write counter 35 are input to the read counter input terminal RC and the write counter input terminal WC of the address selector 36, respectively, as signals of twelve bits. The line synchronous signal SYNC used for resetting the write counter 35 is inverted also to be input to the terminal T- of the toggle F/F 40. Accordingly, a selector signal SEL output by the toggle F/F 40 undergoes a low to high transition or a high to low transition at each fall of the low pulse of the line synchronous signal SYNC, i.e., each rise of the signal input through the terminal T- of the toggle F/F 40.

Figure 11:
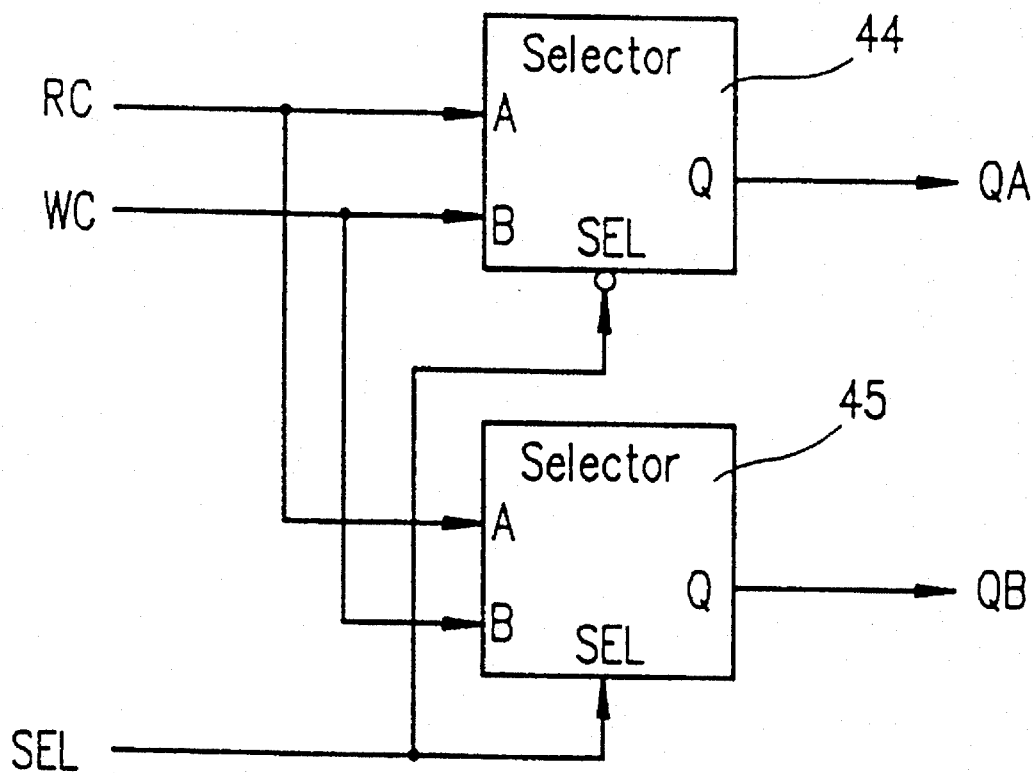
FIG. 11 is a block diagram of an address selector in the optical printer of the invention.

FIG. 11 is a block diagram of the address selector 36. The address selector 36 includes two selectors 44 and 45 both having the same configuration. Each of the two selectors 44 and 45 outputs one of the two systems of the counter values input through the input terminals A and B thereof selected in accordance with the selector signal SEL. Specifically, the counter value output from the read counter 34 is supplied to the input terminals A of the selectors 44 and 45, and the counter value output from the write counter 35 is supplied to the input terminals B. The input selector signal SEL, however, has a different level in the selectors 44 and 45. The selector signal SEL is inverted to be input to the selector 44, and is directly input to the selector 45. As a result, although the same counter value is input to both the input terminals A and B of the selectors 44 and 45, the selector 45 outputs a counter value different from that output by the selector 44. For example, when the selector signal SEL is at a low level, the counter value of the write counter 35 is output from the output terminal QA of the selector 44, and the counter value of the read counter 34 is output from the output terminal QB of the selector 45. When the selector signal SEL is inverted, the selector 44 outputs the counter value of the read counter 34 and the selector 45 outputs the counter value of the write counter 35. In this manner, the counter values of the read counter 34 and the write counter 35 are alternately output from the output terminals QA and QB of the address selector 36, and the counter values from the output terminals QA and QB are different from each other.

The outputs QA and QB of the address selector 36 are respectively supplied to the address input terminal ADR_A of the line memory A 38 and the address input terminal ADR_B of the line memory B 39. As described above, when the selector signal SEL is at a low level, the counter value of the write counter 35 is input to the line memory A 38, and the counter value of the read counter 34 is input to the line memory B 39. The data input terminal DATA_A of the line memory A 38 and the data input terminal DATA_B of the line memory B 39 are both supplied with the externally input image signal DATA. Whether or not the image signal DATA is written in each of the line memory A 38 and the line memory B 39 depends upon a signal input to the write enable terminals WE- of the respective line memories 38 and 39. The write enable terminal WEA- of the line memory A 38 is supplied with the OR of the selector signal SEL and an externally input line effective signal LEN-. The write enable terminal WEB- of the line memory B 39 is supplied with the OR of the inverted signal of the selector signal SEL and the line effective signal LEN-. The line effective signal LEN- is at a low level, in the duration of outputting data regarding one line of pixels, only before the data becomes undefined as described below. Therefore, the signals input to the write enable terminals WEA- and WEB- of the line memory A 38 and the line memory B 39 are alternately at a low level only while the image is effective in scanning each line of pixels. When the signal input to the write enable terminal WEA- or WEB- is at a low level, the image signal DATA input to the corresponding line memory is written therein.

In the following description, the selector signal SEL is assumed to be at a low level as described above. In this case, the write enable terminal WEA- of the line memory A 38 is supplied with a signal at a low level. Accordingly, the line memory A 38 writes the image signal DATA input through the data input terminal DATA_A at an address corresponding to the write counter value input through the address input terminal ADR_A. Specifically, simultaneously with the start of counting by the reset write counter 35, the write counter value is input to the address input terminal ADR_A of the line memory A 38 through the address selector 36. At the same time, a signal input to the write enable terminal WEA- of the line memory A 38 undergoes a high to low transition. As a result, every eight bits of the image signal DATA supplied synchronously with the external clock signal EXTCK is written in the line memory A 38 successively from the 0th address.

When the image data with regard to one line of pixels are finished being written, the line effective signal LEN- undergoes a low to high transition. This makes the signal input to the write enable terminal WEA- of the line memory A 38 also undergo a low to high transition. Since the write counter 35 is continuously supplied with the external clock signal EXTCK, the write counter 35 continues the counting. After sending the image signal DATA with regard to one line of pixels synchronously with line synchronous signal SYNC, the subsequent image signal DATA becomes undefined until the rise of the subsequent line synchronous signal SYNC. Therefore, the address input terminal ADR_A of the line memory A 38 is supplied with the counter value of the write counter 35 still increasing, and the data input terminal DATA_A is supplied with the undefined data. Since the signal input to the write enable terminal WEA- is at a high level, however, the undefined data input to the data input terminal DATA_A is not written in the line memory A 38.

Through the data output terminal OUT_A of the line memory A 38, the data having an address corresponding to the write counter value input through the address input terminal ADR_A is successively read out to be output. While reading the data on the first line of pixels, the image signal DATA written through the data input terminal DATA_A is read out, and after that, the output through the data output terminal OUT_A becomes undefined. The counter value input to the address input terminal ADR_A returns to 0 after counting up to 4095.

The address input terminal ADR_B of the line memory B 39 is supplied with the read counter value, and the data input terminal DATA_B is supplied with the image signal DATA similarly to the data input terminal DATA_A of the line memory A 38. Since the selector signal SEL is at a low level, however, the write enable terminal WEB- is supplied with a signal at a high level. Therefore, the image signal DATA is not written in the line memory B 39. Through the data output terminal OUT_B, the data having an address corresponding to the read counter value input through the address input terminal ADR_B is successively read out to be output. The read data is the image signal DATA having been written in the line memory B 39 when the signal input to the write enable terminal WEB- was at a low level. For example, when the image data D1 regarding the first line of pixels is being input as the image signal DATA, it is the image data D0 regarding the 0th line of pixels having been written in the line memory B 39 that is output through the data output terminal OUT_B.

After reading the image signal regarding one line of pixels through the data output terminal OUT_B of the line memory B 39 in this manner, the read counter 34 is reset by a low pulse of the 8-fold line synchronous signal SYNC8 and starts counting clock signals CLK from 0 again. Therefore, the image signal regarding the same line of pixels is read again through the data output terminal OUT_B of the line memory B 39. Since the read counter 34 keeps on counting the clock signals CLK until the selector signal SEL is inverted, the data on the same line of pixels is read from the line memory B 39 eight times.

The signal read through the data output terminal OUT_A of the line memory A 38 is input to the input terminal A of the data selector 37. Similarly, the signal read through the data output terminal OUT_B of the line memory B 39 is input to the input terminal B of the data selector 37. The select terminal of the data selector 37 is supplied with the inverted signal of the selector signal SEL. As a result, the other line memory is selected than the line memory selected by the address selector 36 for writing. Since the selector signal SEL is at a low level in this case, the data selector 37 selects the line memory B 39, and the signal read through the data output terminal OUT_B of the line memory B 39 is output as the image signal DATA8. For example, when the image data D1 regarding the first line of pixels is being written in the line memory A 38, and the image data D0 regarding the 0th line of pixels is already written in the line memory B 39, the data selector 37 outputs the image data D0 regarding the 0th line of pixels as the image signal DATA8 eight times.

When the image signal regarding one line of pixels is finished being read from the line memory B 39 eight times, the 8-fold line synchronous signal SYNC8 and the line synchronous signal SYNC simultaneously generate low pulses. This resets both the read counter 34 and the write counter 35. The output of the toggle F/F 40 is also simultaneously inverted. When the selector signal SEL, that is, the output of the toggle F/F 40, is inverted, the outputs of the selectors 44 and 45 in the address selector 36 are switched so that the read counter value is output from the output terminal QA of the selector 44 and the write counter value is output from the output terminal QB of the selector 45. Further, the simultaneous low pulses of the synchronous signals SYNC8 and SYNC make the line effective signal LEN- undergo a high to low transition. As a result, the signal input to the write enable terminal WEA- of the line memory A 38 undergoes a low to high transition, and the signal input to the write enable terminal WEB- of the line memory B 39 undergoes a high to low transition. Also, the signal input to the select terminal of the data selector 37 is switched so that the data in the line memory A 38 input through the input terminal A is output as the image signal DATA8. As a result of the above-mentioned operation, the function of the line memory A 38 and that of the line memory B 39 are exchanged so that the memory to be read is changed from the line memory A 38 to the line memory B 39 or vice versa by the simultaneous generation of the low pulses of the synchronous signals SYNC8 and SYNC.

In the actual operation, the simultaneous generation of the low pulses of the line synchronous signal SYNC and the 8-fold line synchronous signal SYNC8 starts the process of one line of pixels. One of the line memories is used for writing, in which the input image signal DATA is written synchronously with the clock signal CLK. When the image signal regarding one line of pixels is finished being written, the write enable signal undergoes a low to high transition, and therefore, the subsequent low pulse of the line synchronous signal SYNC is awaited without changing the written data in the line memory. The other line memory is used for reading only, from which the image signal regarding the previous line of pixels is successively read. Since the image signal is read synchronously with the 8-fold line synchronous signal SYNC8, the same image signal is read eight times. When the image signal is finished being read eight times, the line synchronous signal SYNC and the 8-fold line synchronous signal SYNC8 simultaneously generate low pulses. This leads the switching between the address selector 36 and the data selector 37 connected with the input/output terminals of the respective line memories. As a result, the line memory that has been used for writing only is changed to be used for reading only and the other line memory that has been used for reading only is changed to be used for writing only. In this manner, the input/output operations of the respective line memories are exchanged to process the data on the subsequent line of pixels.

In the line memory A 38 and the line memory B 39 used herein, the position of the data is determined by inputting the address thereof. In the case where an image for each line of pixels is successively written/read in the above-mentioned manner, it is possible to use line memories with an FIFO configuration.

Figure 12:
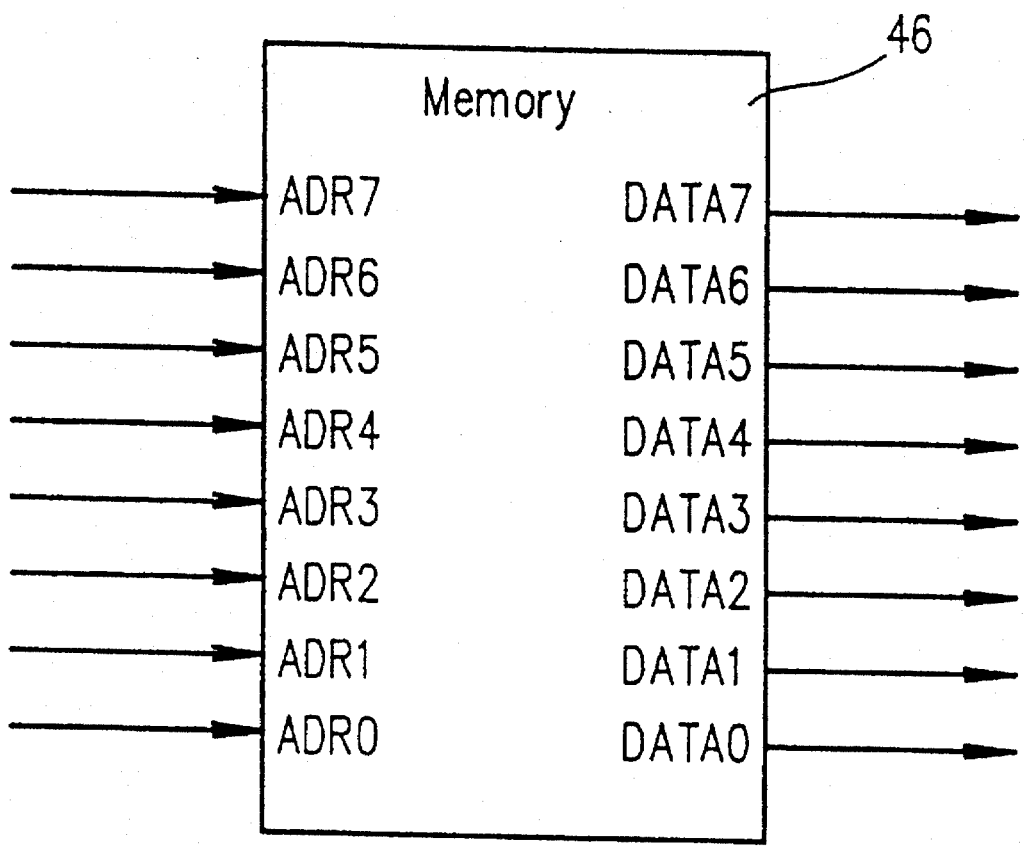
FIG. 12 is a block diagram of an example of a conversion circuit in the optical printer of the invention.

Next, the configuration of the conversion circuit 16 will be described referring to FIG. 12, which is a block diagram of the first example of the conversion circuit 16. The image signal DATA8 output from the line buffer 15 is a signal in which eight-bit data for one line of pixels is repeated eight times. The eight-bit data for one pixel indicates the density of the pixel. The eight bits of the image signal DATA8 are input in parallel through address signal input terminals ADR0 through ADR7 of a memory 46 shown in FIG. 12. Among the exposing patterns of eight bits which have been stored in the memory 46, one exposing pattern corresponding to the density of a pixel indicated by the eight-bit signal at respective positions addressed by the eight-bit signal is selected. Thus, the image signal DATA8 is converted into an eight-bit signal indicating the exposing patterns. The eight bits of the signal indicating the exposing patterns are output from the data output terminals DATA0 through DATA7 in parallel.

When the present invention is applied to a thermal printer, heating patterns for the respective heating elements are stored instead of the exposing patterns. The exposing patterns or the heating patterns are not limited to data of eight bits, and can have any number bits as long as the bit number is equal to the number of sub-pixels in one pixel.

Figure 13:
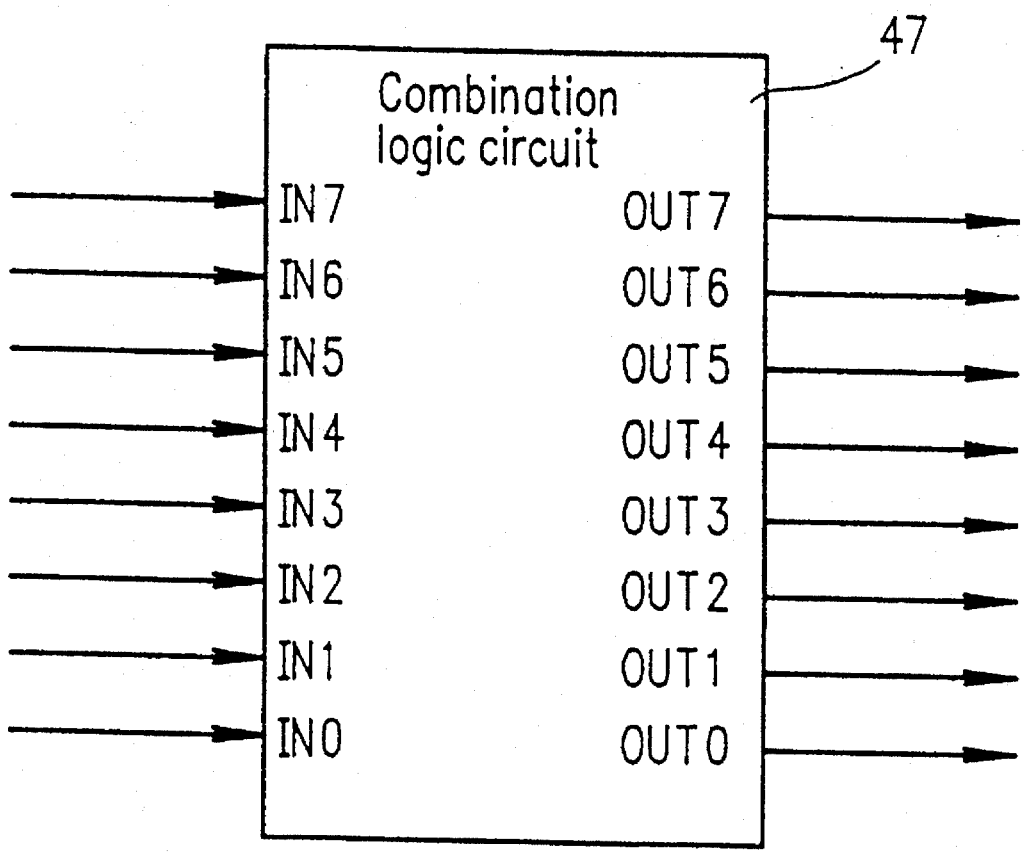
FIG. 13 is a block diagram of another example of the conversion circuit.

FIG. 13 is a block diagram of the second example of the conversion circuit 16. The image signal DATA8 of eight bits output from the line buffer 15 is input to the input terminals IN0 through IN7 of a combination logic circuit 47. When the combination logic circuit 47 receives the image signal indicating the density of one pixel, it supplies a signal indicating an exposing pattern of eight bits corresponding to the density. The image signal input through the input terminal IN0 through IN7 is converted into an exposing pattern of eight bits, and a signal indicating the exposing pattern is output through the output terminals OUT0 through OUT7 in parallel.

In this manner, the image signal DATA8 output from the line buffer 15 is converted, by the conversion circuit 16, into the signal indicating the exposing patterns each of which corresponds to the density, which is input to the selector 17.

Figure 14:
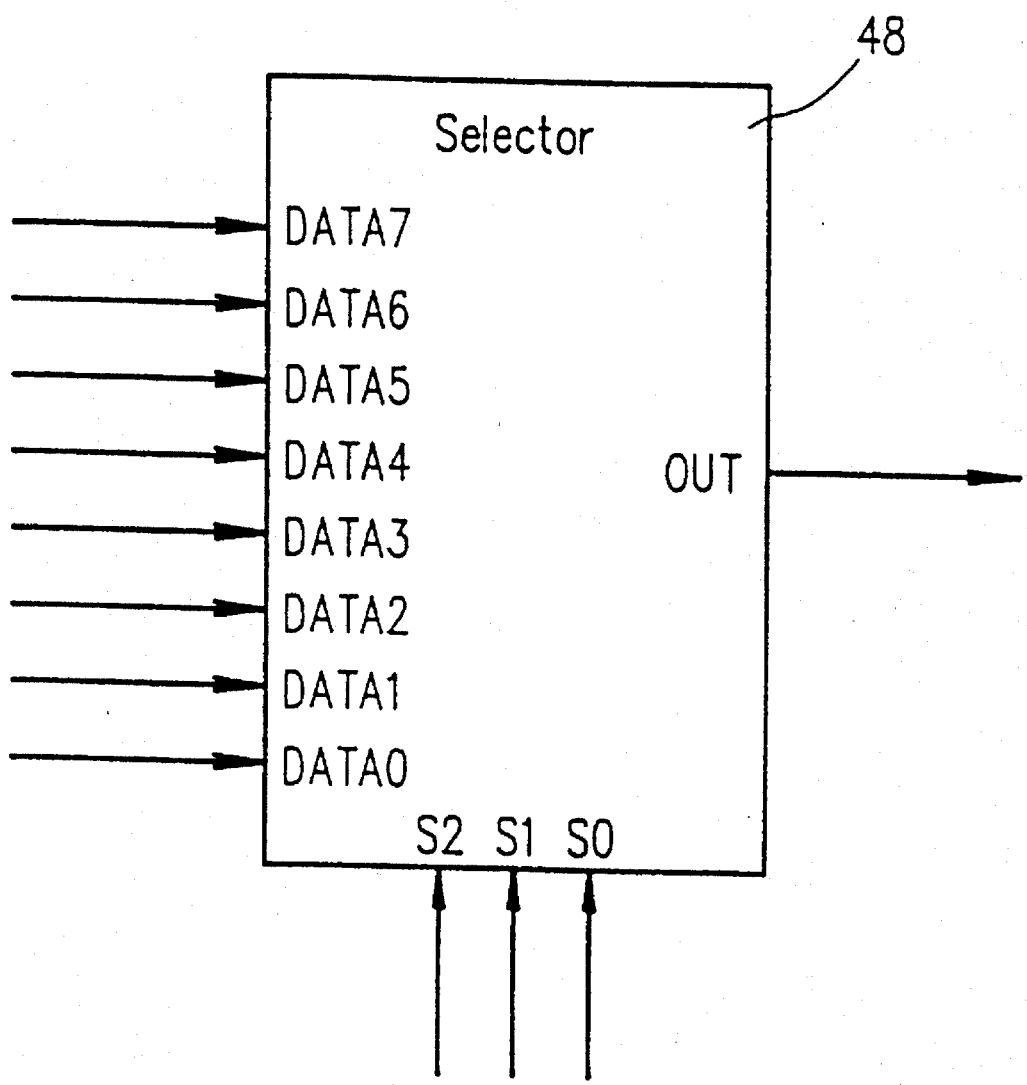
FIG. 14 is a block diagram of a selector in the optical printer of the invention.

FIG. 14 is a block diagram of an example of the selector 17 including a selector 48. The eight bits of the signal indicating the exposing patterns output from the conversion circuit 16 are input through the data input terminals DATA0 through DATA7 of a selector 48 shown in FIG. 14. Select terminals S2, S1 and S0 of the selector 48 are supplied with the counter value CNT of the three-bit counter 31 in the control circuit 18. The input through the select terminals S0 through S2 is counted as a three-bit binary number, and the data input through the input terminal selected by the binary number is output from the output terminal OUT. The exposing patterns with regard to the same line of pixels are input to the selector 17 eight times. The three-bit counter 31 counts up every time the 8-fold line synchronous signal SYNC8 generates a low pulse. In other words, the conversion circuit 16 is supplied with the image signal regarding the same line of pixels eight times, and the three-bit counter 31 counts up every time the image signal is input. Therefore, first, the 0th bits of the signal indicating the exposing patterns for one line of pixels are output successively, and subsequently the 1st bits of the signal indicating the exposing patterns for the same line of pixels are output. This is repeated until the 7th bits of the signal indicating exposing patterns for the same line of pixels are output from the selector 17.

The data output from the selector 17 is directly input to the drive circuit 13 in the LED array head 11. The drive circuit 13 actuates the LED array 12 in accordance with the data input synchronously with the 8-fold line synchronous signal SYNC8. In the first scanning, the LED array 12 conducts exposure in accordance with the data of the 0th bit of the exposing pattern signal corresponding to the density of the pixel. Similarly, in the second scanning, the exposure is conducted in accordance with the 1st Bit of the exposing pattern signal. When the exposure is conducted in accordance with the 7th bit of the exposing pattern signal, the exposure with regard to that line of pixels is finished through the eight scanning in this manner. A similar procedure is repeated with regard to the subsequent line of pixels.

In an optical printer using an array head including a light source extending in the main scanning direction and a liquid crystal device also extending in the main scanning direction such as a liquid crystal page printer, and in a thermal printer, the black and white in an output image is achieved by switching on/off a print head in substantially the same manner. In using such a print head, a pixel is similarly divided in the sub scanning direction and each pixel is scanned the same number of times as the number of the divided portions in one pixel. Therefore, when the LED array head shown in FIG. 5 is replaced with another print head such as a liquid crystal array head and a thermal head, the exposing control circuit 14 has the same configuration as above except that the LED array 12 in FIG. 5 is replaced with a liquid crystal array or a heating element array.

In the above-mentioned example, the light emitting portion of the light emitting element in the LED array 12 is in the shape of a rectangular extending in the alignment direction of the LED array, i.e., in the main scanning direction. The present invention is, however, applicable to an LED array as shown in FIG. 18 having a light emitting element 49 in the shape of an ellipse with the major axis extending in the main scanning direction. Also in the case where the light emitting element as shown in FIG. 18 is used, the exposing profile in the rotating direction of the photosensitive drum (i.e., in the sub scanning direction)

sharply rises from the center of the light emitting element. As a result, although the number of sub-pixels to be exposed is the same, the exposing profile in the entire pixel can be largely varied depending upon the positions of the sub-pixels to be exposed. Therefore, the same effect can be obtained also by using the light emitting element in the shape as shown in FIG. 18. It is needless to say that the same effect can be attained by another type of an array head such as a liquid crystal shutter array by adopting a liquid crystal portion that is opened/closed by the exposure of sub-pixels and extend in the alignment direction of the array.

Figure 19A:
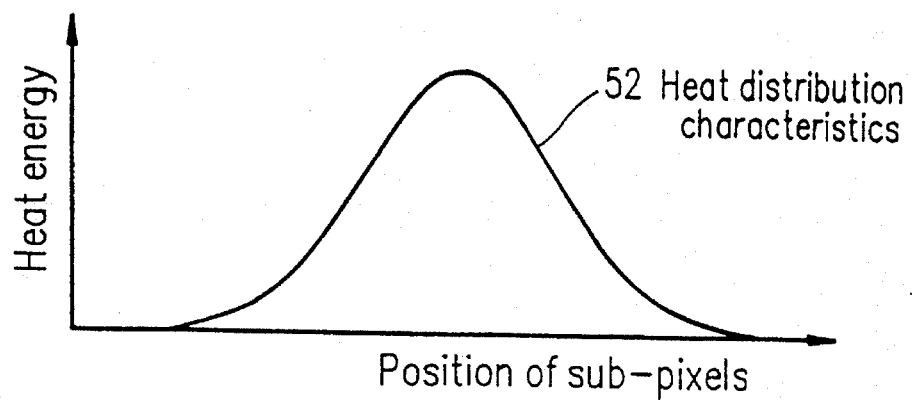
FIGS. 19A and 19B show a heat distribution obtained by a heating element and the shape of the heating element used in a thermal head in accordance with another example of the invention, respectively.
Figure 19B:
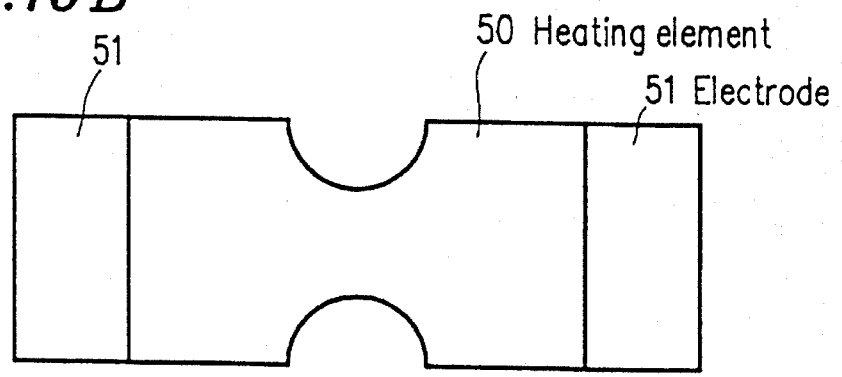
Figure 19C:
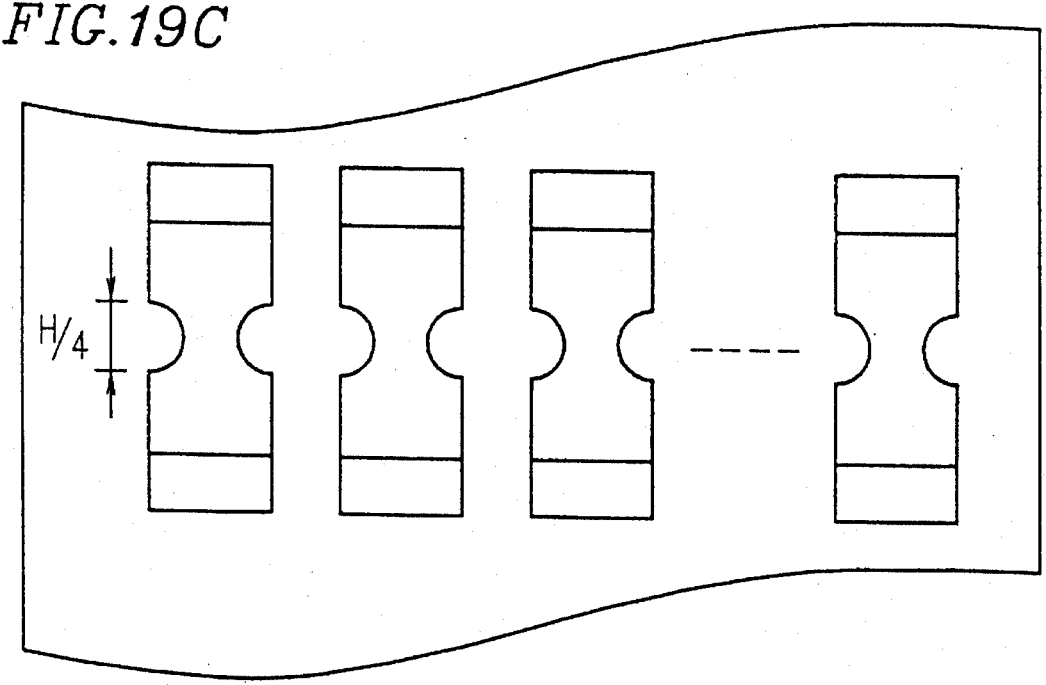
FIG. 19C is a diagram showing a part of the thermal head.

The present invention has been described by exemplifying an optical printer using an LED array head, but the description can be applied to a thermal printer by replacing the exposing patterns with heating patterns of a heating element and the light intensity distribution with a heat distribution. FIG. 19A shows a heat distribution obtained by a heating element used in a thermal head in a thermal printer according to another example of this invention, and FIG. 19B shows the shape of the heating element. FIG. 19C shows a part of the thermal head. When a heating element 50 in a shape as shown in FIG. 19B is conducted, a driving current flows in a certain plane distribution. Specifically, a current flows uniformly in the vicinity of a pair of electrodes 51 provided at the both ends of the heating element 50. Around the center of the heating element, however, a current is collected in a portion with a smaller width since the heating element 50 has a smaller width at the center. As a result, the current density is the largest around the center of the heating element 50. The current density is gradually decreased toward the electrodes 51 since the width of the heating element 50 becomes larger. Thus, the heating element 50 has heat distribution characteristics 52, as shown in the graph of FIG. 19A, in which the heating amount is largest around the center and gradually decreases toward the periphery of the heating element 50. In using a thermal head including a plurality of such heating elements 50 aligned so that the electrodes 51 are positioned at the ends thereof in the main scanning direction as shown in FIG. 19C, it is regarded that the heat distribution characteristics 52 correspond to the divergence of the light with respect to the exposed spot in an optical printer. Therefore, the reproduced density of a pixel can be varied by using various heating patterns to the respective heating elements although each pixel is supplied with a current the same number of times, similarly to the above-mentioned optical printer.

As described above, in the image forming apparatus of this invention, coloring patterns with respect to each pixel for attaining a desired reproduced density are previously stored, and an image signal for each pixel is converted into one of the coloring patterns, thereby scanning sub-pixels in one pixel in accordance with the converted coloring pattern. The scanning of the sub-pixels is performed in the sub scanning direction a number of times the same as the number of the sub-pixels in one pixel, thereby forming an image for one pixel. By adopting the coloring patterns in this manner, the reproducible gray scale levels attain a much larger number than the number of the sub-pixels in one pixel+1. Further, the present invention is applicable not only to an optical printer using an LED array head or a liquid crystal array head or a thermal printer but also to any type of an image forming apparatus as far as one pixel is divided into a plurality of sub-pixels in the sub scanning direction and the sub-pixels are respectively scanned to scan the entire pixel.

Various other modifications will be apparent to and can be readily made by those skilled in the art without departing from the scope and spirit of this invention. Accordingly, it is not intended that the scope of the claims appended hereto be limited to the description as set forth herein, but rather that the claims be broadly construed.

What is claimed is:

1. An image forming apparatus comprising:

converting means for receiving an image signal indicating a density of a pixel in an image formed from a plurality of pixels arranged in a matrix of a main scanning direction and a sub scanning direction crossing at right angles and for converting the image signal into a signal indicating a coloring pattern corresponding to the density; and printing means for receiving the signal indicating coloring pattern and for printing the image on a medium by coloring each of the plurality of pixels in accordance with coloring pattern, wherein each of the plurality of the pixels is divided into N sub-pixels in the sub scanning direction, wherein N is an integer larger than 1, and the converting means generates, as the signal indicating the coloring pattern of each of the plurality of pixels, a signal indicating one of L patterns selected in accordance with the image signal, wherein L is an integer larger than N+1, each of the L patterns indicating which sub-pixels among the N sub-pixels are to be colored, thereby attaining L different densities of the pixel.

2. An image forming apparatus according to claim 1 further comprising a photosensitive body, wherein the printing means comprises exposing means for forming a latent image on the photosensitive body by exposing the photosensitive body in accordance with the selected coloring pattern; developing means for forming the image on the photosensitive body by developing the latent image; and transferring means for transferring the image from the photosensitive body onto the medium.

3. An image forming apparatus according to claim 2, wherein the exposing means comprises a light emitting element array including a plurality of light emitting elements aligned parallel to the main scanning direction and driving means for driving the respective light emitting elements in accordance with the selected coloring pattern.

4. An image forming apparatus according to claim 3, wherein each of the light emitting elements is in a shape of a rectangular having longer sides extending parallel to the main scanning direction.

5. An image forming apparatus according to claim 3, wherein each of the light emitting elements is in a shape of an ellipse with a major axis extending parallel to the main scanning direction.

6. An image forming apparatus according to claim 2, wherein the exposing means includes a light source; light amount control means provided between the photosensitive body and the light source; and driving means for driving the light amount control means in accordance with the selected coloring pattern.

7. An image forming apparatus according to claim 1, wherein the converting means includes memory means for storing the L patterns.

8. An image forming apparatus according to claim 1, wherein the converting means includes a combination logic circuit for receiving the image signal and for outputting one of the L patterns selected in accordance with the image signal as the signal indicating the coloring pattern.

9. An image forming apparatus according to claim 1, wherein the printing means comprises a thermal head including a plurality of heating elements aligned parallel to the main scanning direction and driving means for supplying a current to each of the heating elements to be heated in accordance with the selected coloring pattern.

10. An image forming apparatus according to claim 9, wherein each of the heating elements has heat distribution characteristics so that an amount of heat in each of the heating elements is largest in the center thereof in the main scanning direction and gradually decreases toward a periphery thereof.

11. A printing method comprising the steps of:

converting an image signal indicating a density of a pixel in an image formed from a plurality of pixels arranged in a matrix of a main scanning direction and a sub scanning direction crossing at right angles into a signal indicating a coloring pattern corresponding to the density, each of the plurality of pixels being divided into N sub-pixels aligned in the sub scanning direction, wherein N is an integer larger than 1; and printing the image on a medium by coloring each of the plurality of pixels accordance with the coloring pattern, wherein the step of converting includes the step of generating, as the signal indicating the coloring pattern, a signal indicating one of L patterns selected in accordance with the image signal, wherein L is an integer larger than N+1, each of the L patterns indicating which sub-pixels among the N sub-pixels are to be colored, thereby attaining L different densities of the pixel.

* * * * *